(12) United States Patent
Fujisawa et al.

(10) Patent No.: US 9,837,941 B2
(45) Date of Patent: Dec. 5, 2017

(54) ENGINE GENERATOR

(71) Applicant: YANMAR CO., LTD., Osaka-shi (JP)

(72) Inventors: Toshinobu Fujisawa, Osaka (JP); Kenji Ogata, Osaka (JP); Toshifumi Ise, Suita (JP); Yushi Miura, Suita (JP)

(73) Assignee: YANMAR CO., LTD., Osaka-shi (JP)

(*) Notice: Subject to any disclaimer, the term of this patent is extended or adjusted under 35 U.S.C. 154(b) by 107 days.

(21) Appl. No.: 14/914,112

(22) PCT Filed: May 30, 2014

(86) PCT No.: PCT/JP2014/064376
§ 371 (c)(1),
(2) Date: Feb. 24, 2016

(87) PCT Pub. No.: WO2015/029526
PCT Pub. Date: Mar. 5, 2015

(65) Prior Publication Data
US 2016/0211784 A1    Jul. 21, 2016

(30) Foreign Application Priority Data
Aug. 30, 2013    (JP) .................. 2013-179794

(51) Int. Cl.
*H02P 9/02*    (2006.01)
*H02P 9/30*    (2006.01)
(Continued)

(52) U.S. Cl.
CPC ............ *H02P 9/02* (2013.01); *H02P 9/30* (2013.01); *H02P 9/48* (2013.01); *H02J 7/1492* (2013.01); *Y02T 10/92* (2013.01)

(58) Field of Classification Search
CPC ....... H02J 7/1492; Y02E 10/725; Y02T 10/92
(Continued)

(56) References Cited

U.S. PATENT DOCUMENTS 5,726,551 A * 3/1998 Miyazaki ............ B60L 11/1803
                                                       320/104
8,030,882 B2 * 10/2011 Ito ........................... B60K 6/48
                                                       307/66
(Continued)

FOREIGN PATENT DOCUMENTS

| JP | 2009-011021 A | 1/2009 |
| JP | 2011-112178 A | 6/2011 |
| WO | WO-2009/001604 A1 | 12/2008 |

OTHER PUBLICATIONS

International Search Report dated Aug. 19, 2014, issued for PCT/JP2014/064376.

*Primary Examiner* — Tulsidas C Patel
*Assistant Examiner* — Charles Reid, Jr.
(74) *Attorney, Agent, or Firm* — Locke Lord LLP

(57) ABSTRACT

An engine generator detects a DC voltage in a path from a rectifier to an inverter in controlling charge/discharge, and makes a duty ratio in switching control of a charging conductor of a power storage device higher than a duty ratio in the switching control of a discharging conductor of the power storage device when the DC voltage is higher than a target voltage of the DC voltage, and makes the duty ratio in the switching control of the discharging conductor of the power storage device higher than the duty ratio in the switching control of the charging conductor of the power storage device when the DC voltage is lower than the target voltage.

4 Claims, 15 Drawing Sheets

(51) Int. Cl.
*H02P 9/48* (2006.01)
*H02J 7/14* (2006.01)

(58) Field of Classification Search
USPC .......................................................... 322/89
See application file for complete search history.

(56) References Cited

U.S. PATENT DOCUMENTS

| | | | |
|---|---|---|---|
| 8,227,935 B2* | 7/2012 | Nishiyama | H02J 7/345 307/46 |
| 2009/0251000 A1* | 10/2009 | Su | B60L 11/1887 307/9.1 |
| 2010/0071971 A1* | 3/2010 | Tatematsu | B60L 11/1803 180/65.8 |
| 2011/0031927 A1* | 2/2011 | Kajouke | H02J 7/022 320/108 |
| 2011/0187184 A1* | 8/2011 | Ichikawa | B60L 1/003 307/10.1 |
| 2012/0056580 A1* | 3/2012 | Kai | H02J 5/005 320/108 |
| 2013/0106365 A1* | 5/2013 | Ang | B60L 3/0069 320/138 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

ENGINE GENERATOR

TECHNICAL FIELD

The present invention relates to an engine generator that generates power using a generator driven by an engine.

BACKGROUND ART

In an engine generator that generates power using a generator driven by an engine, an engine rotational number (engine rotational speed) varies according to a change in a load during autonomous operation. Thus, an allowable rotational speed range (allowable speed change range) is generally predetermined for the engine. The engine generator operates unstably when the engine rotational speed deviates from the allowable engine rotational speed range. For example, when a load is once cut off for some reason and then is re-applied, it is necessary to consider the allowable engine rotational speed range for applying the load. Accordingly, in the engine generator, the amount of load that can be applied is limited.

In this regard, Patent Document 1 discloses a configuration in which power storage means (power storage device) including a capacitor and the like is provided in a path on the DC side from a generator to an inverter so as to address the change in the load by discharge of the power storage means while operating the generator constantly at the maximum efficiency point. Thus, the change in the engine rotational speed is suppressed.

PRIOR ART DOCUMENT

Patent Document

[Patent Document 1] JP 2011-112178 A

SUMMARY OF INVENTION

Problem to be Solved by Invention

However, in the configuration described in Patent Document 1, shortage of power to be supplied to the load is calculated to compensate the shortage by discharge of the power storage means. Thus, it is necessary to calculate the shortage of power to be supplied to the load.

In consideration of the above circumstances, an object of the present invention is to provide an engine generator in which a power storage device including a capacitor and the like is provided on the DC side so as to suppress the change in the engine rotational speed during autonomous operation without calculating shortage of power to be supplied to the load. Accordingly, an amount of load that can be applied can be increased.

Means for Solving Problem

In order to resolve the above problem, the inventors of the present invention extensively studied, and found the following to achieve the present invention.

That is, an engine generator has a configuration in which: an output from a generator driven by an engine is rectified by a rectifier; a DC power from the rectifier is converted into an AC power by an inverter; and a power storage device is provided in parallel with the generator in a path from the rectifier to the inverter. In such an engine generator, a DC voltage from the rectifier to the inverter is controlled so as to be constant (hereinafter referred to as "constant DC voltage control"), or controlled so as to not deviate from a dead zone, when performing charge/discharge control of the power storage device by controlling conduction of a charging conductor and a discharging conductor of the power storage device. Thus, it is possible to maintain the change in the rotational speed of the engine during autonomous operation within a predetermined acceptable rotational speed range without calculating shortage of the power to be supplied to the load, thereby enabling to increase the amount of load that can be applied.

The present invention is based on the above knowledge, and to provide an engine generator of the following first embodiment and second embodiment.

(1) Engine Generator of First Embodiment

An engine generator includes: an engine; a generator configured to be driven by the engine; a rectifier configured to rectify an output from the generator; an inverter configured to convert a DC power from the rectifier into an AC power; and a power storage device provided in parallel with the generator in a path from the rectifier to the inverter, the power storage device including a charging conductor and a discharging conductor. The engine generator controls conduction of the charging conductor and the discharging conductor so as to control charge/discharge of the power storage device. A DC voltage in the path from the rectifier to the inverter is detected in controlling the charge/discharge. When the DC voltage is higher than a target voltage of the DC voltage, a duty ratio in switching control of the charging conductor of the power storage device is set higher than a duty ratio in the switching control of the discharging conductor of the power storage device. When the DC voltage is lower than the target voltage, the duty ratio in the switching control of the discharging conductor of the power storage device is set higher than the duty ratio in the switching control of the charging conductor of the power storage device.

In the engine generator according to the first embodiment of the present invention, it is possible to show, exemplarily, a configuration in which: when a voltage of the power storage device is lower than a setting voltage in a state in which the DC voltage is converged into the target voltage, the duty ratio in the switching control of the charging conductor of the power storage device is made higher than a normal value so as to change a distribution of the duty ratio on a side of the charging conductor in the switching control of the charging conductor and the discharging conductor.

(2) Engine Generator of Second Embodiment

An engine generator includes: an engine; a generator configured to be driven by the engine; a rectifier configured to rectify an output from the generator; an inverter configured to convert a DC power from the rectifier into an AC power; and a power storage device provided in parallel with the generator in a path from the rectifier to the inverter, the power storage device including a charging conductor and a discharging conductor. The engine generator controls conduction of the charging conductor and the discharging conductor so as to control charge/discharge of the power storage device. A DC voltage in the path from the rectifier to the inverter is detected in controlling the charge/discharge. When the DC voltage is higher than a value obtained by adding a dead zone range to a target voltage of the DC voltage, a duty ratio in switching control of the charging conductor of the power storage device is set higher than a duty ratio in the switching control of the discharging conductor of the power storage device. When the DC voltage is lower than a value obtained by subtracting the dead zone range from the target voltage, the duty ratio in the switching control of the discharging conductor of the power storage device is set higher than the duty ratio in the switching control of the charging conductor of the power storage device.

In the engine generator according to the second embodiment of the present invention, it is possible to show, exemplarily, a configuration in which: a load power is detected so as to change the dead zone to a value relative to the load power with a delay corresponding to a time constant not less than a predetermined value.

In the engine generator according to the second embodiment of the present invention, it is possible to show, exemplarily, a configuration in which: when a voltage of the power storage device is lower than a setting voltage in a state in which the DC voltage falls within the dead zone range, the switching control of the charging conductor of the power storage device is performed.

In the engine generator according to the first embodiment and the second embodiment of the present invention, it is possible to show, exemplarily, a configuration in which: the switching control of the discharging conductor or the charging conductor is performed so as to recover the voltage of the power storage device to a predetermined voltage.

Effects of Invention

With the present invention, it is possible to suppress the change in the engine rotational speed during autonomous operation within the predetermined allowable engine rotational speed range without calculating shortage of power to be supplied to a load. Accordingly, an amount of load that can be applied can be increased.

BRIEF DESCRIPTION OF DRAWINGS

FIG. 2(a) shows an example of a first step-down chopper, and FIG. 2(b) shows an example of a first boost chopper.

FIG. 4(a) is a graph showing a temporal change in a DC voltage when a power storage device is not added to the engine generator, while FIG. 4(b) is a graph showing a temporal change in an engine rotational speed when the power storage device is not added to the engine generator.

FIG. 5(a) is a graph showing a temporal change in the DC voltage when the power storage device is added to the engine generator, while FIG. 5(b) is a graph showing a temporal change in the engine rotational speed when the power storage device is added to the engine generator.

FIG. 6(a) shows an example of a second step-down chopper, and FIG. 6(b) shows an example of a second boost chopper.

FIG. 9(a) is a control block diagram of the delay processing. FIG. 9(b) is a flowchart of the delay processing to be performed prior to the processing in step S22 of the flowchart of FIG. 7.

FIG. 10(a) is a graph showing a temporal change in the DC voltage under condition 2, and FIG. 10(b) is a graph showing a temporal change in the engine rotational speed under condition 2.

FIG. 11(a) is a graph showing a temporal change in the DC voltage under condition 3, and FIG. 11(b) is a graph showing a temporal change in the engine rotational speed under condition 3.

FIG. 12(a) shows an example of a third step-down chopper, and FIG. 12(b) shows an example of a third boost chopper.

FIG. 13(a) is a graph showing the waveform in the case where the EDLC voltage recovery control is not performed. FIG. 13(b) is a graph showing the waveform in the case where the EDLC voltage recovery control is performed.

FIG. 14(a) shows an example of a fourth step-down chopper, and FIG. 14(b) shows an example of a fourth boost chopper.

MODES FOR CARRYING OUT INVENTION

Hereinafter, embodiments according to the present invention will be described with reference to the drawings.

Figure 1:
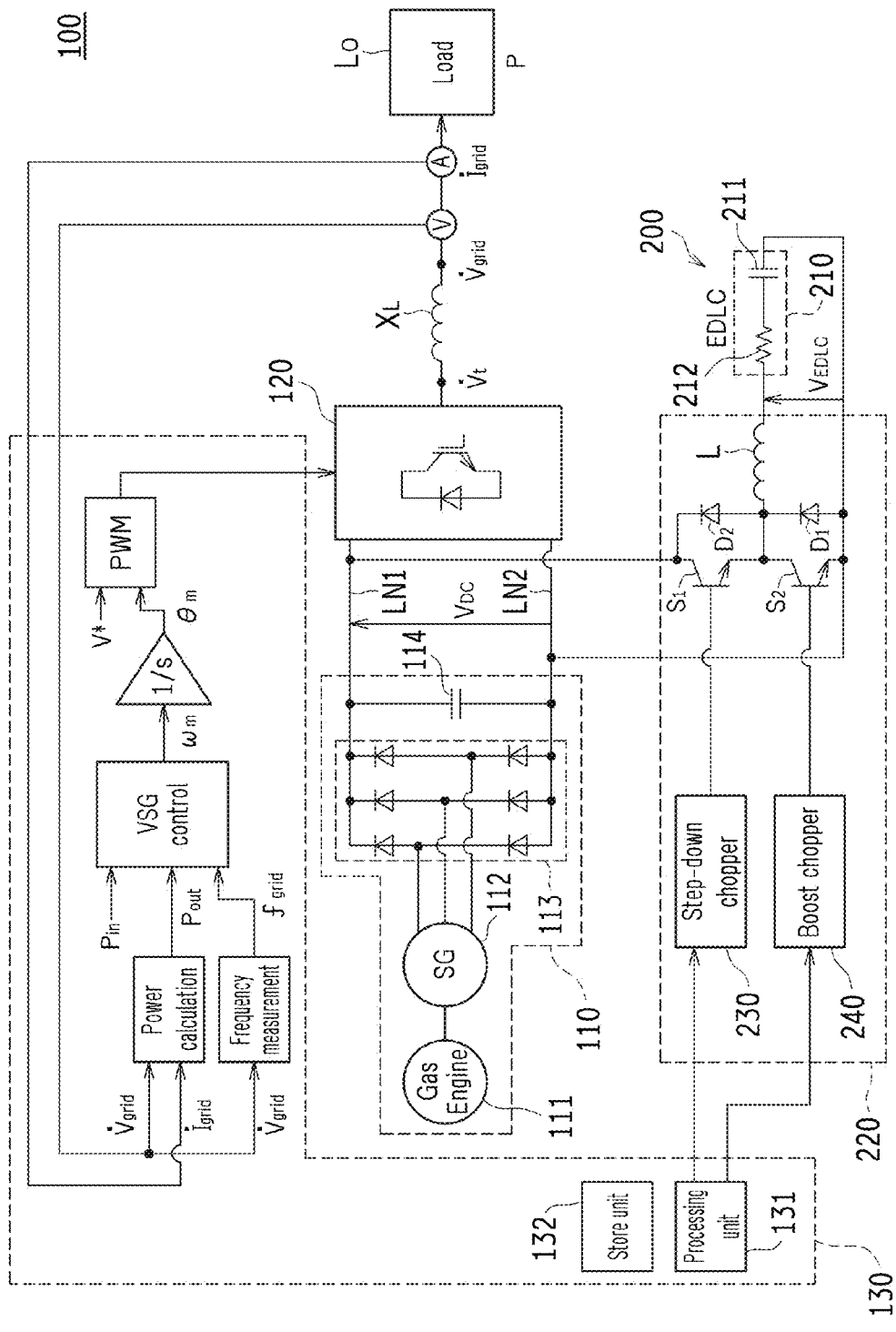
FIG. 1 is a system block diagram showing a schematic configuration of an engine generator according to embodiments of the present invention.

FIG. 1 is a system block diagram showing a schematic configuration of an engine generator 100 according to the embodiments of the present invention.

In the engine generator 100 in FIG. 1, a power supply 110 (e.g., a dispersed power supply) to output a DC voltage has characteristics as a synchronous generator. Thus, the engine generator 100 acts as so-called virtual synchronous generator (VSG) having a function to improve a system stability during system interconnection by increasing followability of an inverter 120 that converts the DC voltage from the power supply 110 into an AC voltage against disturbance that occurs in the system such as instantaneous power failure and instantaneous voltage drop. Note that the engine generator 100 is applied to a gas engine cogeneration system here, but is not limited thereto.

Specifically, the engine generator 100 includes, in addition to the power supply 110 and the inverter 120, a power storage device 200 and a control unit 130 that controls totally the engine generator 100.

The power supply 110 includes: an engine 111; a generator 112 that obtains output power by a rotational driving force of the engine 111; a rectifier 113 that converts the output power (AC voltage) from the generator 112 into the DC voltage; and a capacitor 114.

Here, the engine 111 to rotate and drive the generator 112 is a gas engine, but is not limited thereto. The engine 111 may be an engine other than the gas engine.

The generator 112 has an automatic voltage regulator (AVR). The output side of the generator 112 is connected to the input side of the rectifier 113. The generator 112 is here a three-phase AC generator, but is not limited thereto. The generator 112 may be a single-phase AC generator.

The rectifier 113 consists of a plurality of diodes. Here, 6 diodes constitute a diode bridge. The output side of the rectifier 113 is connected to the DC side of the inverter 120.

Between the rectifier 113 and the inverter 120, the capacitor 114 is connected in parallel with the rectifier 113 and the inverter 120.

The inverter 120 is constituted by a reverse blocking type switching element, and the AC side of the inverter 120 is connected to a load Lo via an inductor $X_L$.

The control unit 130 includes: a processing unit 131 such as a CPU (central processing unit); and a store unit 132 including a non-volatile memory such as a ROM (read only memory), a writable non-volatile memory such as a flash memory, and a volatile memory such as a RAM (random access memory).

In the engine generator 100, the processing unit 131 of the control unit 130 loads a control program, which is pre-stored in the ROM of the store unit 132, on the RAM of the store unit 132. Thus, the control program is executed to control various components. Also, the non-volatile memory of the store unit 132 stores various kinds of system information such as operating parameters and setting data of the engine generator 100.

(VSG Control)

Next, VSG control is described. In the inverter 120 for controlling the current, the output voltage and frequency depend on the system at the time of system interconnection, which leads to the following problems that: the power supply 110 for controlling the current cannot absorb disturbance of the system because it has no inertia unlike the synchronous generator; and it is difficult to perform uninterruptible switching between the system interconnection and the autonomous operation. The VSG control can resolve the above problems.

The control unit 130 performs the VSG control in which the engine generator 100 acts as a virtual synchronous generator (VSG).

The power storage device 200 storages power corresponding to kinetic energy stored in inertia of the synchronous generator. From this, the power supply 110 can virtually have inertia. The VSG control in FIG. 1 causes the inverter 120 to simulate the same characteristics as the synchronous generator. In this way, the power supply 110 can have the characteristics similar to those of the synchronous generator. For example, the power supply 110 can autonomously synchronize with another generator due to synchronizing power, and can absorb disturbance occurred in the system by the virtual inertia so as to improve the stability of the system. Furthermore, since it is possible to operate by the same control during system interconnection as well as during autonomous operation, the uninterruptible switching can be performed from the system interconnection to the autonomous operation.

(Suppression of Change in Engine Rotational Speed by Power Storage Device)

Next, description will be given on suppression of the change in the rotational speed of the engine 111 by the power storage device 200 during autonomous operation of the engine generator 100.

The engine generator 100 (see FIG. 1) in the configuration of the above-described virtual synchronous generator increases the amount of load that can be applied by suppressing the change in the rotational speed of the engine 111 during autonomous operation.

It is possible to use the power storage device 200 that includes an electric double layer capacitor (EDLC) 210. As the EDLC 210 stores electrical energy as is, it can charge and discharge rapidly. In this embodiment, the object is to increase the amount of load to be applied by suppressing the change in the rotational speed of the engine 111 when the load changes. The EDLC 210 compensates the difference between a load power P and the output power of the generator 112 when the load changes. Thus, the power storage device that can exchange energy in a short time is preferable for compensating the difference between the load power P and the output power of the generator 112 when the load changes. Therefore, in this embodiment, the power storage device 200 including the EDLC 210 is adopted.

Specifically, the power storage device 200 includes the EDLC 210 and a chopper circuit 220.

In the EDLC 210, a capacitor 211 and a resistor 212 are connected to each other in series.

The chopper circuit 220 is a two-quadrant chopper circuit (combined circuit of a step-down chopper 230 and a boost chopper 240). As the chopper circuit 220 is the two-quadrant chopper circuit, it is possible to perform a step-down chopper operation in case of viewing the EDLC 210 side from the DC link side, and perform a boost chopper operation in case of viewing the DC link side from the EDLC 210 side.

Specifically, the chopper circuit 220 includes, in addition to the step-down chopper 230 and the boost chopper 240, a first semiconductor switch $S_1$, a first diode $D_1$, a second semiconductor switch $S_2$, a second diode $D_2$ and an inductor L.

The first semiconductor switch $S_1$, which serves as a charging conductor to carry the current in order to charge the EDLC 210, is a semiconductor device to control a current-carrying time by ON-OFF control signals. The second semiconductor switch $S_2$, which serves as a discharging conductor to carry the current in order to discharge the EDLC 210, is a semiconductor device to control a current-carrying time by ON-OFF control signals. The current flow-in side (in this example, a collector side) of the first semiconductor switch $S_1$ is connected to a positive electrode path LN1 that connects between the rectifier 113 and the inverter 120, and the current flow-out side (in this example, an emitter side) is connected to an end of the inductor L. The current flow-in side (in this example, the collector side) of the second semiconductor switch $S_2$ is connected to an end of the inductor L, and the current flow-out side (in this example, the emitter side) is connected to a negative electrode path LN2 that connects between the rectifier 113 and the inverter 120.

The first diode $D_1$ is connected in parallel with the second semiconductor switch $S_2$ so as to carry the current in the direction opposite to the direction in which the second semiconductor switch $S_2$ curries the current. The second diode $D_2$ is connected in parallel with the first semiconductor switch $S_1$ so as to carry the current in the direction opposite to the direction in which the first semiconductor switch $S_1$ carries the current.

The positive electrode of the EDLC 210 is connected to the other end of the inductor L, and the negative electrode of the EDLC 210 is connected to the negative electrode path LN2.

(Control of Power Storage Device)

The control unit 130 controls conduction of the first semiconductor switch $S_1$ and the second semiconductor switch $S_2$ so as to control charge/discharge of the power storage device 200. In order to control charge/discharge of the power storage device 200, the control unit 130 performs constant DC voltage control (first embodiment) or DC voltage control with a dead zone (second embodiment).

First Embodiment

—Constant DC Voltage Control—

The control unit 130 performs control to maintain a DC voltage $V_{DC}$ (voltage across terminals of the capacitor 114) between the paths LN1 and LN2 from the rectifier 113 to the inverter 120 as a constant value, by an automatic voltage regulator (AVR) of the generator 112, and the power storage device 200.

Figure 2:
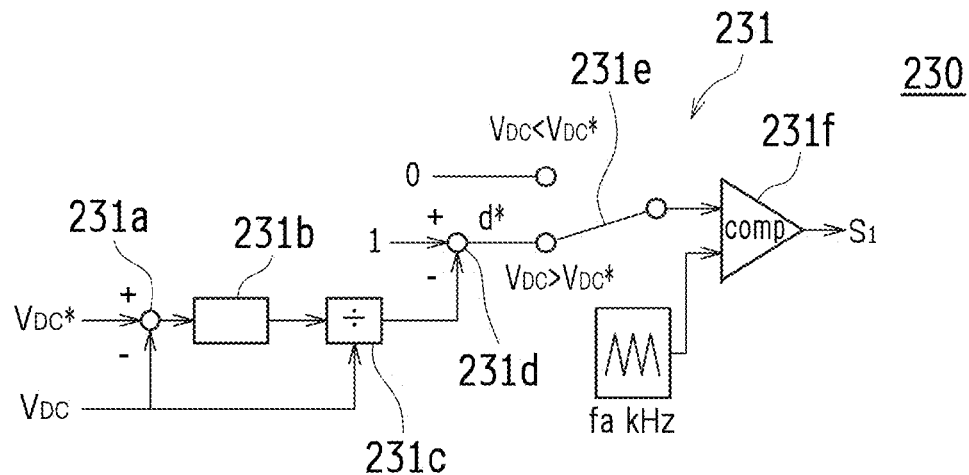
FIG. 2 are control block diagrams of a step-down chopper and a boost chopper including constant DC voltage control.
Figure 2:
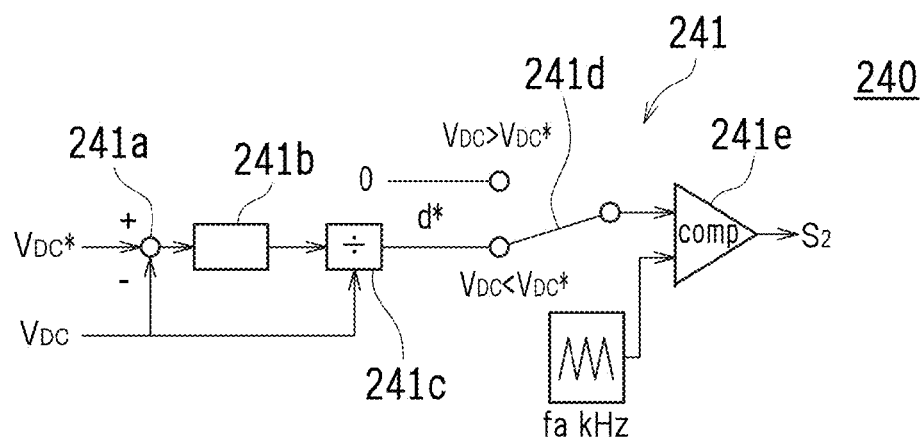

FIG. 2 are control block diagrams of the step-down chopper 230 and the boost chopper 240 including the constant DC voltage control. FIG. 2(a) shows an example of a first step-down chopper 231, and FIG. 2(b) shows an example of a first boost chopper 241. Note that FIG. 2(a) shows a state in which the step-down chopper operation is performed while FIG. 2(b) shows a state in which the boost chopper operation is performed.

The step-down chopper 230 includes the first step-down chopper 231 and the boost chopper 240 includes the first boost chopper 241. The first step-down chopper 231 and the first boost chopper 241 are to perform the constant DC voltage control.

As shown in FIG. 2(a), the first step-down chopper 231 is constituted by: a subtractor 231a that subtracts the DC voltage $V_{DC}$ from a DC voltage command value $V_{DC}^*$ (target voltage of the DC voltage $V_{DC}$); a controller 231b that controls an output value of the subtractor 231a; a divider 231c that divides an output value of the controller 231b by the DC voltage $V_{DC}$; a subtractor 231d that subtracts an output value of the divider 231c from the value "1"; a switcher 231e that switches a value to be input between the value "0" and an output value of the subtractor 231d; and a comparator 231f to which an output value of the switcher 231e and a triangle wave are input.

As shown in FIG. 2(b), the first boost chopper 241 is constituted by: a subtractor 241a that subtracts the DC voltage $V_{DC}$ from the DC voltage command value $V_{DC}^*$; a controller 241b that controls an output value of the subtractor 241a; a divider 241c that divides an output value of the controller 241b by the DC voltage $V_{DC}$; a switcher 241d that switches a value to be input between the value "0" and an output value of the divider 241c; and a comparator 241e to which an output value of the switcher 241d and a triangle wave are input.

Note that, in FIG. 2, d* represents a duty ratio (conduction ratio) command value. The frequency fa of the triangle wave that is input to the comparators 231f and 241e may be appropriately set.

Then, output signals (control signals) of the comparators 231f and 241e are respectively input to a control signal input side (in this example, base side) of the first semiconductor switch $S_1$ (see FIG. 1) and a control signal input side (in this example, base side) of the second semiconductor switch $S_2$ (see FIG. 1).

The control unit 130 detects the DC voltage $V_{DC}$. When the detected DC voltage $V_{DC}$ is higher than the DC voltage command value $V_{DC}^*$, the control unit 130 performs the step-down chopper operation (see FIG. 2(a)) to have the EDLC 210 absorb the power, thereby decreasing the DC voltage $V_{DC}$. On the other hand, when the detected DC voltage $V_{DC}$ is lower than the DC voltage command value $V_{DC}^*$, the control unit 130 performs the boost chopper operation (see FIG. 2(b)) to have the EDLC 210 release the power, thereby increasing the DC voltage $V_{DC}$. The control unit 130 can detect the DC voltage $V_{DC}$ using a DC voltage detection unit (not shown).

Figure 3:
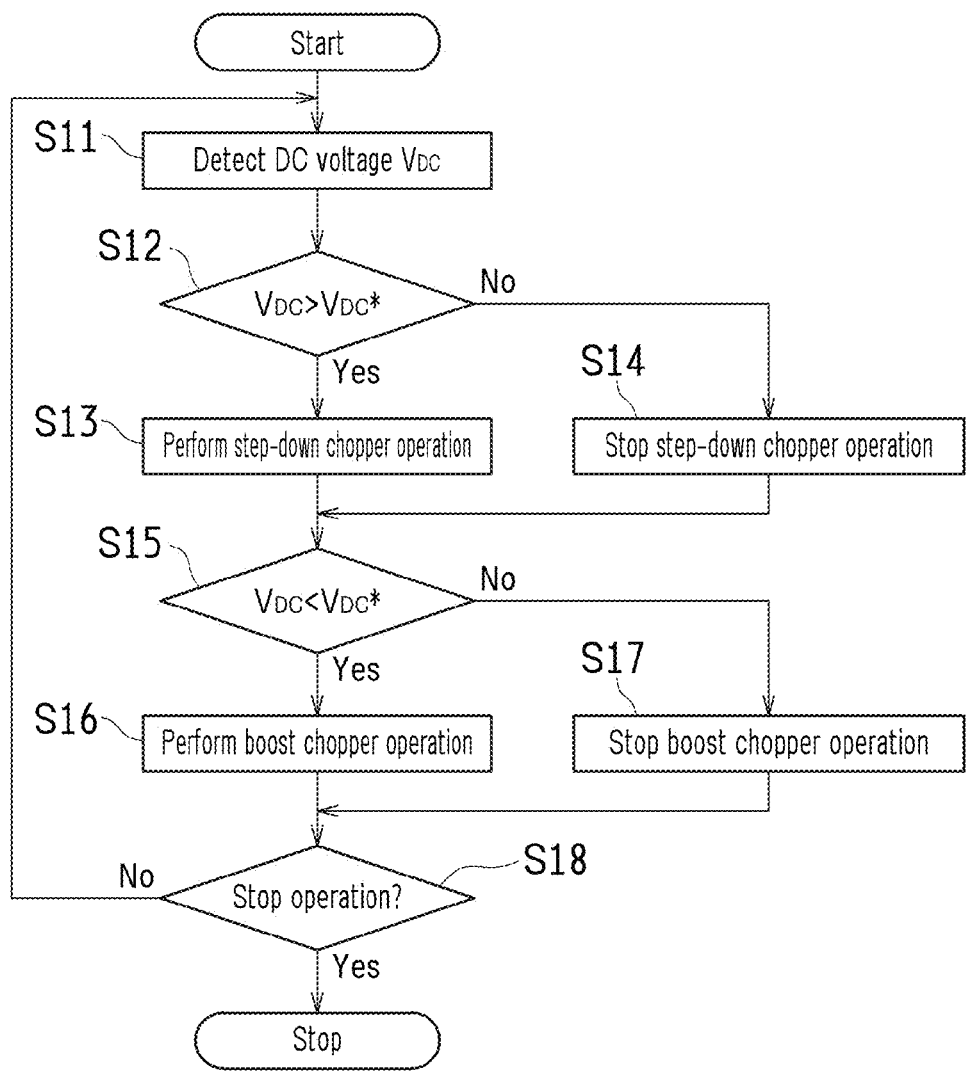
FIG. 3 is a flowchart showing a processing flow of a control unit to perform an example of the constant DC voltage control.

FIG. 3 is a flowchart showing a processing flow of the control unit 130 to perform an example of the constant DC voltage control.

First, the control unit 130 detects the DC voltage $V_{DC}$ between the paths LN1 and LN2 from the rectifier 113 to the inverter 120 (step S11).

Next, the control unit 130 determines whether the DC voltage $V_{DC}$ is higher than the DC voltage command value $V_{DC}^*$ (step S12). When it is determined that the DC voltage $V_{DC}$ is higher than the DC voltage command value $V_{DC}^*$ (step S12: Yes), the control unit 130 performs the step-down chopper operation (step S13) by switching the switcher 231e to input the output value of the subtractor 231d to the comparator 231f in the first step-down chopper 231 (see FIG. 2(a)), then the procedure goes to step S15. That is, in this step-down chopper operation, the duty ratio (conduction ratio) d in the switching control of the first semiconductor switch $S_1$ is made higher than the duty ratio (conduction ratio) d in the switching control of the second semiconductor switch $S_2$. In this example, the control unit 130 stops the switching control of the second semiconductor switch $S_2$ (boost chopper operation), which makes the second semiconductor switch $S_2$ and the second diode $D_2$ be in the OFF state.

On the other hand, when it is determined that the DC voltage $V_{DC}$ is lower than (or, not more than) the DC voltage command value $V_{DC}^*$ (step S12: No), the control unit 130 stops the switching control of the first semiconductor switch $S_1$ in the power storage device 200, by switching the switcher 231e to input the value "0" to the comparator 231f in the first step-down chopper 231 (see FIG. 2(a)), thereby stopping the step-down chopper operation (step S14), thus the procedure goes to step S15.

Next, the control unit 130 determines whether the DC voltage $V_{DC}$ is lower than the DC voltage command value $V_{DC}^*$ (step S15). When it is determined that the DC voltage $V_{DC}$ is lower than the DC voltage command value $V_{DC}^*$ (step S15: Yes), the control unit 130 performs the boost chopper operation (step S16) by switching the switcher 241d to input the output value of the divider 241c to the comparator 241e in the first boost chopper 241 (see FIG. 2(b)), then the procedure goes to step S18. That is, in this boost chopper operation, the duty ratio (conduction ratio) d in the switching control of the second semiconductor switch $S_2$ is made higher than the duty ratio (conduction ratio) d in the switching control of the first semiconductor switch $S_1$. In this example, the control unit 130 stops the switching control of the first semiconductor switch $S_1$ (step-down chopper operation), which makes the first semiconductor switch $S_1$ and the first diode $D_1$ be in the OFF state.

On the other hand, when it is determined that the DC voltage $V_{DC}$ is higher than (or, not less than) the DC voltage command value $V_{DC}^*$ (step S15: No), the control unit 130 stops the switching control of the second semiconductor switch $S_2$ in the power storage device 200, by switching the switcher 241d to input the value "0" to the comparator 241e in the first boost chopper 241 (see FIG. 2(b)), thereby stopping the boost chopper operation (step S17), thus the procedure goes to step S18.

The control unit 130 repeatedly performs the processing of steps S11 to S18 unless it receives an instruction to stop the operation (step S18: No), and when it receives the instruction to stop the operation (step S18: Yes), it stops the operation.

In this way, it is possible to maintain the DC voltage $V_{DC}$ as the constant DC voltage command value $V_{DC}^*$.

—Evaluation Results of Constant DC Voltage Control—

Hereinafter, description will be given on evaluation of the constant DC voltage control with reference to FIGS. 4 and 5.

In the evaluation of the constant DC voltage control, the DC voltage command value was set to a value $V_{DC}^*$ in the automatic voltage regulator (AVR) of the generator 112 and the power storage device 200, and the control was performed so that the DC voltage $V_{DC}$ equaled the DC voltage command value $V_{DC}^*$ when changing the load from no-load to full-load.

Figure 4:
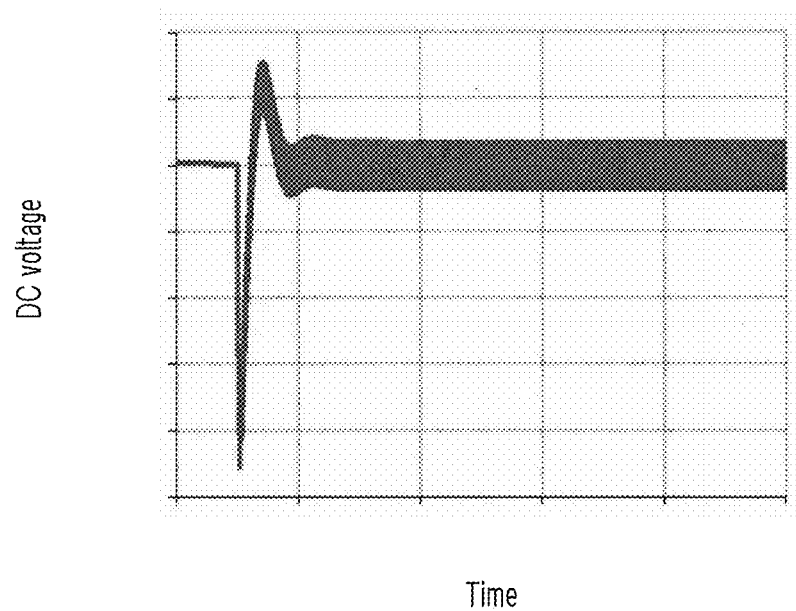
FIG. 4 are graphs showing evaluation results of the constant DC voltage control.
Figure 4:
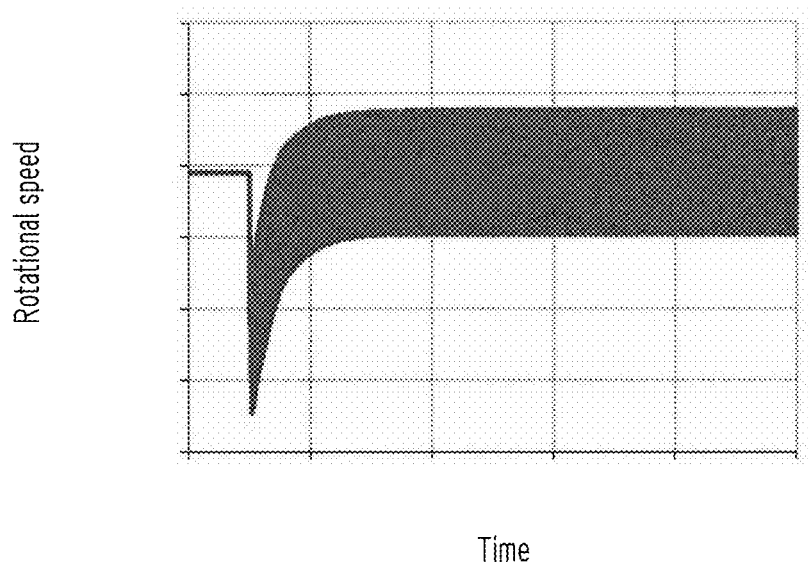
Figure 5:
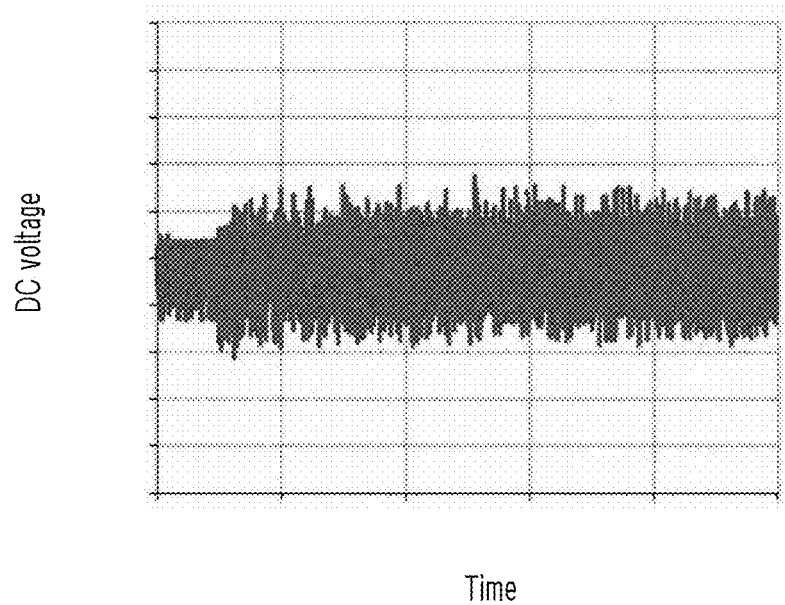
FIG. 5 are graphs showing evaluation results of the constant DC voltage control.
Figure 5:
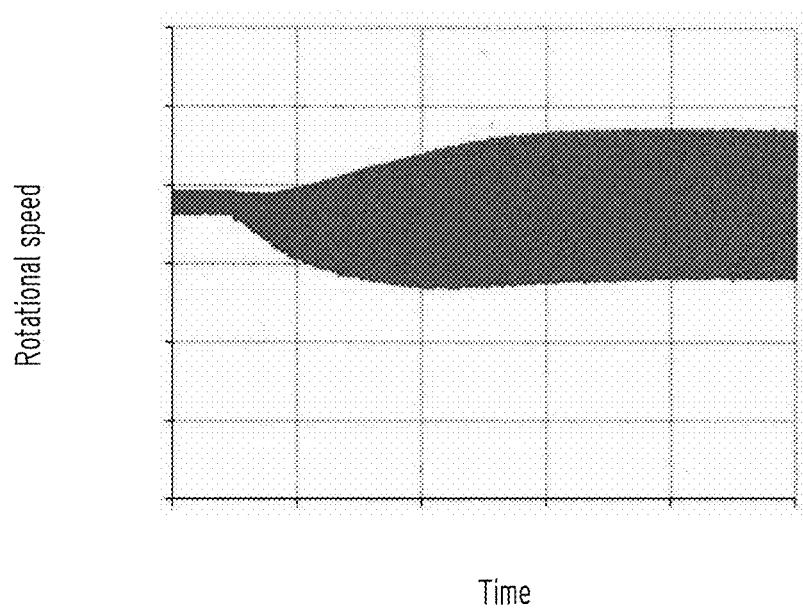

FIGS. 4 and 5 are graphs showing the evaluation results of the constant DC voltage control. FIG. 4(a) is a graph showing a temporal change in the DC voltage $V_{DC}$ when the power storage device 200 is not added to the engine generator 100, while FIG. 4(b) is a graph showing a temporal change in the engine rotational speed when the power storage device 200 is not added to the engine generator 100. FIG. 5(a) is a graph showing a temporal change in the DC voltage $V_{DC}$ when the power storage device 200 is added to the engine generator 100, while FIG. 5(b) is a graph showing a temporal change in the engine rotational speed when the power storage device 200 is added to the engine generator 100.

As shown in FIG. 4, when changing the load from no-load to full-load in the case where the power storage device 200 is not added to the engine generator 100, the rotational speed of the engine 111 (see FIG. 4(b)) is considerably changed. On the other hand, as shown in FIG. 5, when changing the load from no-load to full-load in the case where the power storage device 200 is added to the engine generator 100, the change in the rotational speed of the engine 111 (see FIG. 5(b)) is remarkably suppressed by the power storage device 200.

Second Embodiment

—DC Voltage Control with Dead Zone—

In the constant DC voltage control of the first embodiment, it is necessary to continuously operate the power storage device 200 in order to keep the DC voltage $V_{DC}$ constant. In contrast, in the DC voltage control with a dead zone of the second embodiment, the control unit 130 controls the power storage device 200 so that it operates only when the DC voltage $V_{DC}$ deviates from the dead zone. This is to prevent the power storage device 200 from continuously operating and to reduce loss in the power storage device 200.

Figure 6:
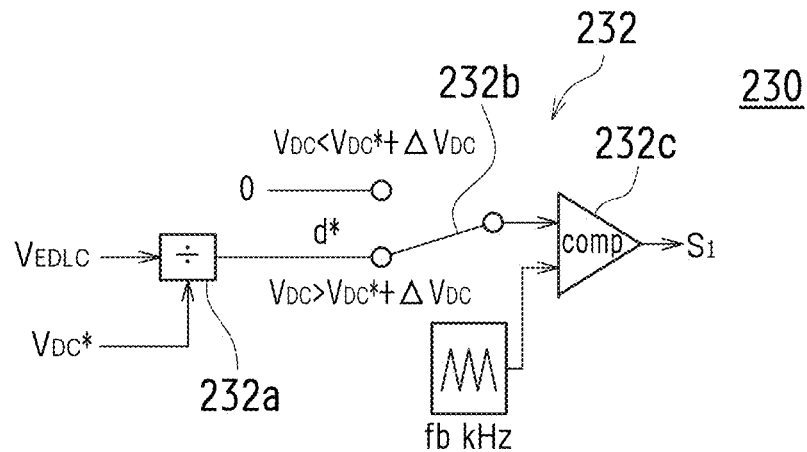
FIG. 6 are control block diagrams of a step-down chopper and a boost chopper including DC voltage control with a dead zone.
Figure 6:
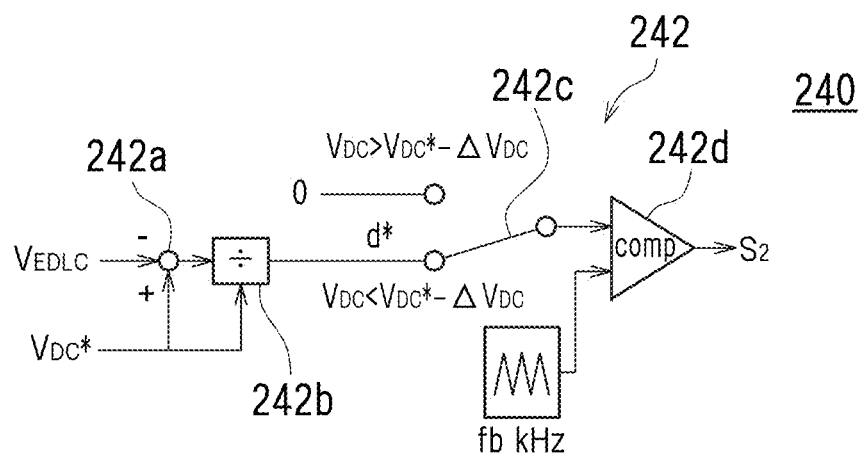

FIG. 6 are control block diagrams of the step-down chopper 230 and the boost chopper 240 including the DC voltage control with the dead zone. FIG. 6(a) shows an example of a second step-down chopper 232, and FIG. 6(b) shows an example of a second boost chopper 242. Note that FIG. 6(a) shows a state in which the step-down chopper operation is performed while FIG. 6(b) shows a state in which the boost chopper operation is performed.

The step-down chopper 230 includes the second step-down chopper 232 and the boost chopper 240 includes the second boost chopper 242. The second step-down chopper 232 and the second boost chopper 242 are to perform the DC voltage control with the dead zone.

As shown in FIG. 6(a), the second step-down chopper 232 is constituted by: a divider 232a that divides an EDLC voltage $V_{EDLC}$ that is a voltage of the EDLC 210 by the DC voltage command value $V_{DC}^*$; a switcher 232b that switches a value to be input between the value "0" and an output value of the divider 232a; and a comparator 232c to which an output value of the switcher 232b and the triangle wave are input.

As shown in FIG. 6(b), the second boost chopper 242 is constituted by: a subtractor 242a that subtracts the EDLC voltage $V_{EDLC}$ from the DC voltage command value $V_{DC}^*$; a divider 242b that divides an output value of the subtractor 242a by the DC voltage command value $V_{DC}^*$; a switcher 242c that switches a value to be input between the value "0" and an output value of the divider 242b; and the comparator 242d to which an output value of the switcher 242c and the triangle wave are input.

Note that, in FIG. 6, d* represents a duty ratio (conduction ratio) command value, and $\Delta V_{DC}$ represents the dead zone range. The frequency fb of the triangle wave that is input to the comparators 232c and 242d may be appropriately set. The dead zone range $\Delta V_{DC}$ is pre-stored (preset) in the store unit (non-volatile memory) 132 of the control unit 130.

Then, output signals (control signals) of the comparators 232c and 242d are respectively input to the control signal input side (in this example, base side) of the first semiconductor switch $S_1$ (see FIG. 1) and the control signal input side (in this example, base side) of the second semiconductor switch $S_2$ (see FIG. 1).

The control unit 130 detects the DC voltage $V_{DC}$. When the detected DC voltage $V_{DC}$ is higher than an added value ($V_{DC}^* + \Delta V_{DC}$) obtained by adding the dead zone range $\Delta V_{DC}$ to the DC voltage command value $V_{DC}^*$ (target voltage of the DC voltage $V_{DC}$), the control unit 130 performs the step-down chopper operation (see FIG. 6(a)) to have the EDLC 210 absorb the power, thereby decreasing the DC voltage $V_{DC}$. On the other hand, when the detected DC voltage $V_{DC}$ is lower than a subtracted value ($V_{DC}^* - \Delta V_{DC}$) obtained by subtracting the dead zone range $\Delta V_{DC}$ from the DC voltage command value $V_{DC}^*$, the control unit 130 performs the boost chopper operation (see FIG. 6(b)) to have the EDLC 210 release the power, thereby increasing the DC voltage $V_{DC}$. The control unit 130 can detect the DC voltage $V_{DC}$ using a DC voltage detection unit (not shown).

Figure 7:
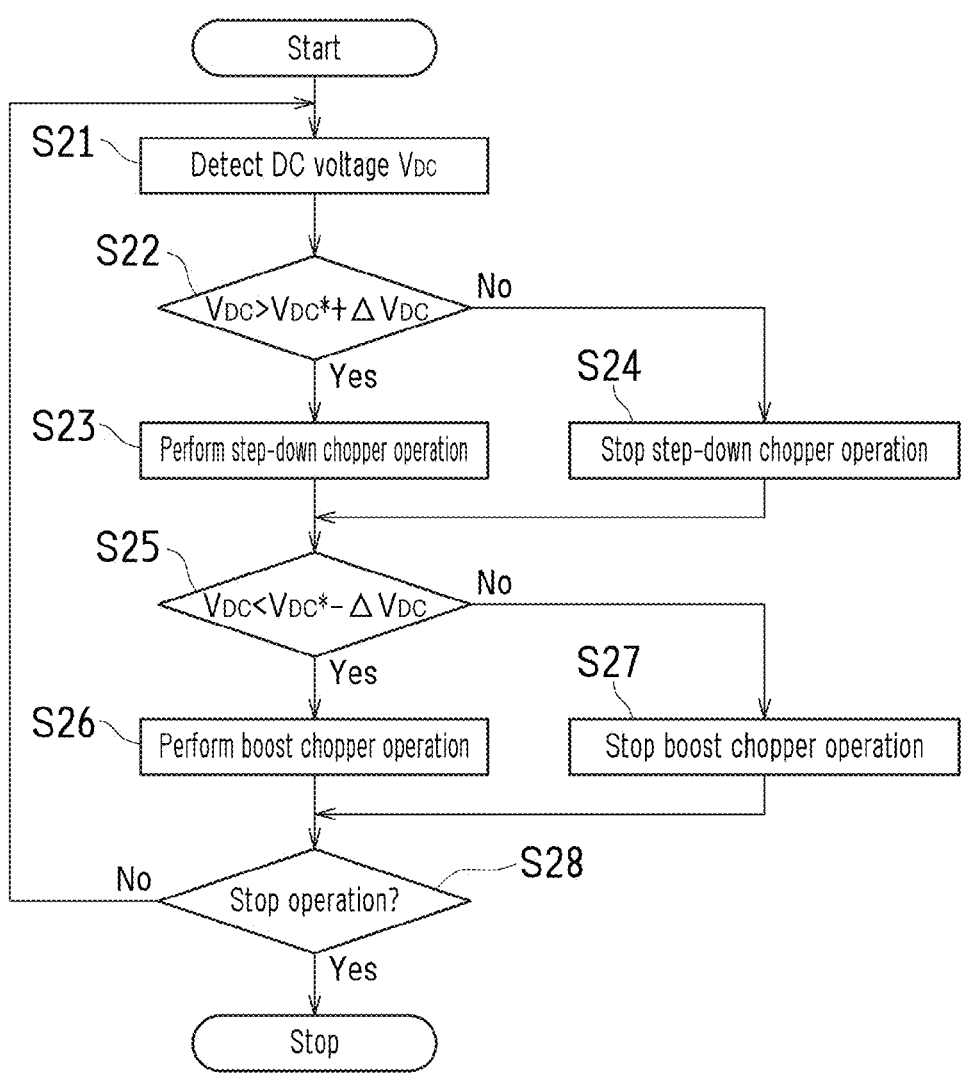
FIG. 7 is a flowchart showing a processing flow of the control unit to perform an example of the DC voltage control with the dead zone.

FIG. 7 is a flowchart showing a processing flow of the control unit 130 to perform an example of the DC voltage control with the dead zone.

First, the control unit 130 detects the DC voltage $V_{DC}$ between the paths LN1 and LN2 from the rectifier 113 to the inverter 120 (step S21).

Next, the control unit 130 determines whether the DC voltage $V_{DC}$ is higher than the added value ($V_{DC}^* + \Delta V_{DC}$) obtained by adding the dead zone range $\Delta V_{DC}$ to the DC voltage command value $V_{DC}^*$ (step S22). When it is determined that the DC voltage $V_{DC}$ is higher than the added value ($V_{DC}^* + \Delta V_{DC}$) (step S22: Yes), the control unit 130 performs the step-down chopper operation (step S23) by switching the switcher 232*b* to input the output value of the divider 232*a* to the comparator 232*c* in the second step-down chopper 232 (see FIG. 6(*a*)), then the procedure goes to step S25. That is, in this step-down chopper operation, the duty ratio (conduction ratio) d in the switching control of the first semiconductor switch S$_1$ is made higher than the duty ratio (conduction ratio) d in the switching control of the second semiconductor switch S$_2$. In this example, the control unit 130 stops the switching control of the second semiconductor switch S$_2$ (boost chopper operation), which makes the second semiconductor switch S$_2$ and the second diode D$_2$ be in the OFF state.

On the other hand, when it is determined that the DC voltage V$_{DC}$ is lower than (or not more than) the added value (V$_{DC}$*+ΔV$_{DC}$) (step S22: No), the control unit 130 stops the switching control of the first semiconductor switch S$_1$ in the power storage device 200, by switching the switcher 232*b* to input the value "0" to the comparator 232*c* in the second step-down chopper 232 (see FIG. 6(*a*)), thereby stopping the step-down chopper operation (step S24), thus the procedure goes to step S25. At this time, the boost chopper operation is also being stopped.

It is possible to transmit the power from the DC link to the EDLC 210 by performing the step-down chopper operation, viewing from the DC link side, by the first semiconductor switch S$_1$ and the first diode D$_1$ shown in FIG. 1. In this case, the DC voltage V$_{DC}$ and the EDLC voltage V$_{EDLC}$ have the relationship represented by expression (1) below.

[Mathematical 1]

$$V_{EDLC} = dV_{DC} \qquad \text{Expression (1)}$$

In the above expression (1), d represents the duty ratio (conduction ratio).

Next, the control unit 130 determines whether the DC voltage V$_{DC}$ is lower than the subtracted value (V$_{DC}$*−ΔV$_{DC}$) obtained by subtracting the dead zone range ΔV$_{DC}$ from the DC voltage command value V$_{DC}$* (step S25). When it is determined that the DC voltage V$_{DC}$ is lower than the subtracted value (V$_{DC}$*−ΔV$_{DC}$) (step S25: Yes), the control unit 130 performs the boost chopper operation (step S26) by switching the switcher 242*c* to input the output value of the divider 242*b* to the comparator 242*d* in the second boost chopper 242 (see FIG. 6(*b*)), then the procedure goes to step S28. That is, in this boost chopper operation, the duty ratio (conduction ratio) d in the switching control of the second semiconductor switch S$_2$ is made higher than the duty ratio (conduction ratio) d in the switching control of the first semiconductor switch S$_1$. In this example, the control unit 130 stops the switching control of the first semiconductor switch S$_1$ (step-down chopper operation), which makes the first semiconductor switch S$_1$ and the first diode D$_1$ be in the OFF state.

On the other hand, when it is determined that the DC voltage V$_{DC}$ is higher than (or not less than) the subtracted value (V$_{DC}$*−ΔV$_{DC}$) (step S25: No), the control unit 130 stops the switching control of the second semiconductor switch S$_2$ in the power storage device 200, by switching the switcher 242*c* to input the value "0" to the comparator 242*d* in the second boost chopper 242 (see FIG. 6(*b*)), thereby stopping the boost chopper operation (step S27), thus the procedure goes to step S28. At this time, the step-down chopper operation is also being stopped.

It is possible to transmit the power from the EDLC 210 to the DC link by performing the boost chopper operation, viewing from the EDLC 210 side, by the second semiconductor switch S$_2$ and the second diode D$_2$ shown in FIG. 1.

In this case, the DC voltage V$_{DC}$ and the EDLC voltage V$_{EDLC}$ have the relationship represented by expression (2) below.

[Mathematical 2]

$$V_{DC} = 1/(1-d) \times V_{EDLC} \qquad \text{Expression (2)}$$

From expressions (1) and (2), the duty ratio (conduction ratio) command values d* in the step-down chopper operation and the boost chopper operation are represented, respectively, by expressions (3) and (4) below.

[Mathematical 3]

$$d^* = V_{EDLC}/V_{DC}^* \qquad \text{Expression (3)}$$

[Mathematical 4]

$$d^* = (V_{DC}^* - V_{EDLC})/V_{DC}^* \qquad \text{Expression (4)}$$

The control unit 130 repeatedly performs the processing of steps S21 to S28 unless it receives an instruction to stop the operation (step S28: No), and when it receives the instruction to stop the operation (step S28: Yes), it stops the operation.

—Dead Zone—

When performing the DC voltage control with the dead zone of the second embodiment, as mentioned before, the control unit 130 controls the power storage device 200 so that it operates only when the DC voltage V$_{DC}$ deviates from the dead zone by the change in the load in order to reduce loss in the power storage device 200. In the store unit (non-volatile memory) 132 of the control unit 130, a dead zone (dead zone range ΔV$_{DC}$) of the DC voltage V$_{DC}$ is preset. When the DC voltage V$_{DC}$ changes according to the change in the load, and when such a change causes deviation of the DC voltage V$_{DC}$ from the dead zone, the control unit 130 operates and controls the power storage device 200 so that the power storage device 200 releases the power or absorbs the power.

The respective duty ratio (conduction ratio) command values d* of the second step-down chopper 232 (see FIG. 6(*a*)) and the second boost chopper 242 (see FIG. 6(*b*)) are obtained by the aforementioned expressions (3) and (4), however, whether the second step-down chopper 232 and the second boost chopper 242 operate or not is determined by the dead zone (dead zone range ΔV$_{DC}$).

In this regard, the control unit 130 of the engine generator 100 is configured to set a constant dead zone regardless of the magnitude (value) of the load power P, or to change the dead zone relative to the load power P.

<Configuration in which Constant Dead Zone is Set>

First, description will be given on a case in which a constant dead zone is set in the control unit 130 of the engine generator 100.

When the dead zone is set, the control unit 130 does not perform the constant DC voltage control of the first embodiment. Thus, when the amount of load changes, the DC voltage V$_{DC}$ also changes within the dead zone. The DC voltage V$_{DC}$ becomes maximum during no-load, and the DC voltage V$_{DC}$ becomes minimum during full-load.

Then, in the store unit (non-volatile memory) 132 of the control unit 130, a lower limit and an upper limit of the dead zone is pre-stored (preset) based on the waveform of the DC voltage V$_{DC}$ during full-load and during no-load.

Also, the DC voltage command value V$_{DC}$* is an average of the upper limit and the lower limit.

In this way, regardless of the magnitude of the load power P, the constant dead zone range ΔV$_{DC}$ is set in the store unit 132 of the control unit 130. Accordingly, the control unit 130 does not operate the power storage device 200 when the DC voltage $V_{DC}$ falls within the constant dead zone range, and operates the power storage device 200 when the DC voltage $V_{DC}$ deviates from the constant dead zone range.

<Configuration in which Dead Zone is Changed>

Next, description will be given on a case in which the dead zone is changed relative to the load power P in the control unit 130 of the engine generator 100.

When the dead zone is made constant by the control unit 130, the DC voltage $V_{DC}$ does not frequently deviate from the dead zone (in particular during the transition period) depending on the magnitude of the dead zone range $\Delta V_{DC}$, which results in the power storage device 200 not frequently operating. Like this, when the power storage device 200 does not operate, compensation energy decreases, according to which suspension of the change in the rotational speed cannot be expected.

Therefore, the control unit 130 is configured to detect the load power P and to change the dead zone and the DC voltage command value $V_{DC}^*$ relative to the detected load power P. In this way, the control unit 130 can change the DC voltage $V_{DC}$ (in particular, the DC voltage $V_{DC}$ during the transition period) relative to the load power P. Thus, compared with the case in which the dead zone is constant, it is possible to improve the effect of suppressing the change in the rotational speed of the engine 111. The control unit 130 can detect the load power P using the load power detection unit (not shown).

Specifically, the control unit 130 includes a dead zone range calculation unit 133 (see FIG. 9(a) described later) that calculates the upper limit and lower limit of the dead zone and the DC voltage command value $V_{DC}^*$ based on the value of the load power P. Thus, the upper limit and lower limit of the dead zone and the DC voltage command value $V_{DC}^*$ can be obtained by the dead zone range calculation unit 133 based on the value of the load power P.

Figure 8:
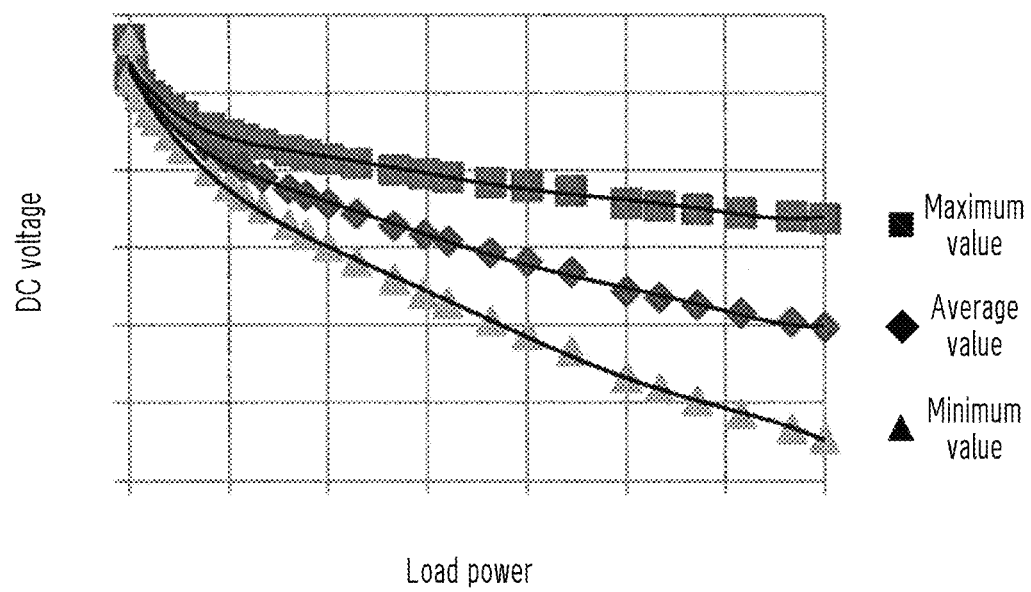
FIG. 8 is a graph showing maximum values, minimum values and average values of the DC voltage and their respective approximate curves when a load power is changed.

FIG. 8 shows maximum values, minimum values and average values of the DC voltage $V_{DC}$ and their respective approximate curves when the load power P is changed.

Here, the approximate curve expression of the maximum value, the approximate curve expression of the minimum value and the approximate curve expression of the average value are pre-stored (preset) in the store unit (non-volatile memory) 132 in the control unit 130.

Figure 9:
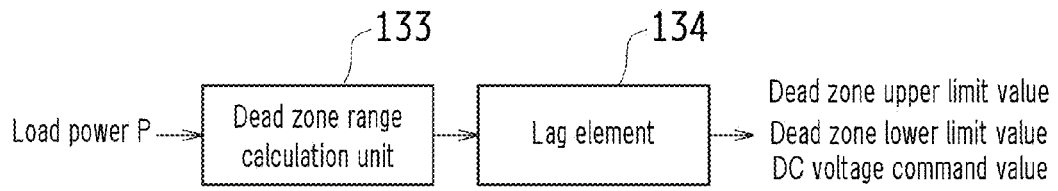
FIG. 9 are explanatory diagrams to explain delay processing to change a dead zone relative to the load power with a delay corresponding to a time constant that is not less than a predetermined value.
Figure 9:
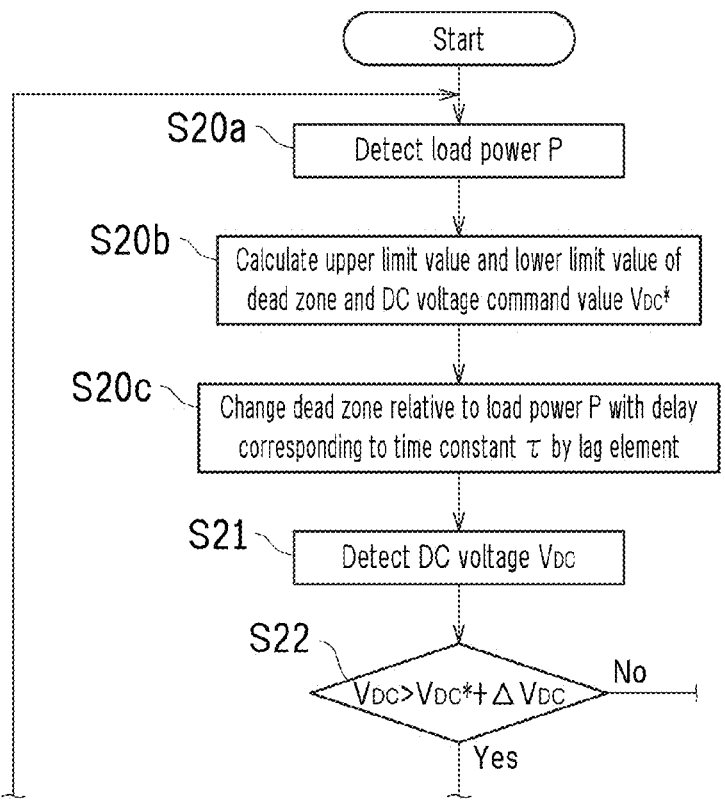

FIG. 9 are explanatory diagrams to explain delay processing to change the dead zone relative to the load power P with a delay corresponding to the time constant τ that is not less than a predetermined value. FIG. 9(a) is a control block diagram of the delay processing. FIG. 9(b) is a flowchart of the delay processing to be performed prior to the processing in step S22 of the flowchart of FIG. 7.

The dead zone range calculation unit 133 calculates the upper limit and lower limit of the dead zone and the DC voltage command value $V_{DC}^*$, based on the value of the load power P, in accordance with the respective approximate curve expressions of the maximum value, the minimum value and the average value of the DC voltage $V_{DC}$ relative to the load power P (see FIG. 8). In place of the respective approximate curve expressions, conversion tables may be used for converting the value of the load power P into the upper limit and lower limit of the dead zone and the DC voltage command value $V_{DC}^*$.

The control unit 130 includes a lag element 134 (see FIG. 9(a)) that changes the dead zone relative to the load power P with a delay corresponding to the time constant not less than the predetermined value.

As shown in FIG. 9(a), the lag element 134 is provided on the output side of the dead zone range calculation unit 133. The delay processing of steps S20a to S20c shown FIG. 9(b) is performed prior to the processing of step S22 in the flowchart shown in FIG. 7. Note that the delay processing of steps S20a to S20c may be performed after the processing of step S21 provided that it is performed before the processing of step S22.

As shown in FIG. 9(b), in the delay processing of steps S20a to S20c, the load power P is detected (step S20a), the upper limit and lower limit of the dead zone and the DC voltage command value $V_{DC}^*$ are calculated by the dead zone range calculation unit 133 (step S20b), and the dead zone is changed relative to the load power P with the delay corresponding to the time constant τ by the lag element 134 (step S20c). Like this, changing the delay time constant τ can change the response speed of the dead zone relative to the change in the load. Thus, it is possible to change the deviation rate of the DC voltage $V_{DC}$ from the dead zone by changing the response speed of the dead zone, which results in improvement of an effect of suppressing the rotational speed of the engine 111.

—Evaluation Results of DC Voltage Control with Dead Zone—

Hereinafter, description will be given on evaluation of the DC voltage control with the dead zone with reference to FIGS. 10 and 11.

In the evaluation of the DC voltage control with the dead zone, the DC voltage $V_{DC}$ was controlled under respective conditions 1 to 3 described below when changing the load from no-load to full-load:

Condition 1: without power storage device 200;
Condition 2: constant dead zone; and
Condition 3: changing dead zone.

Figure 10:
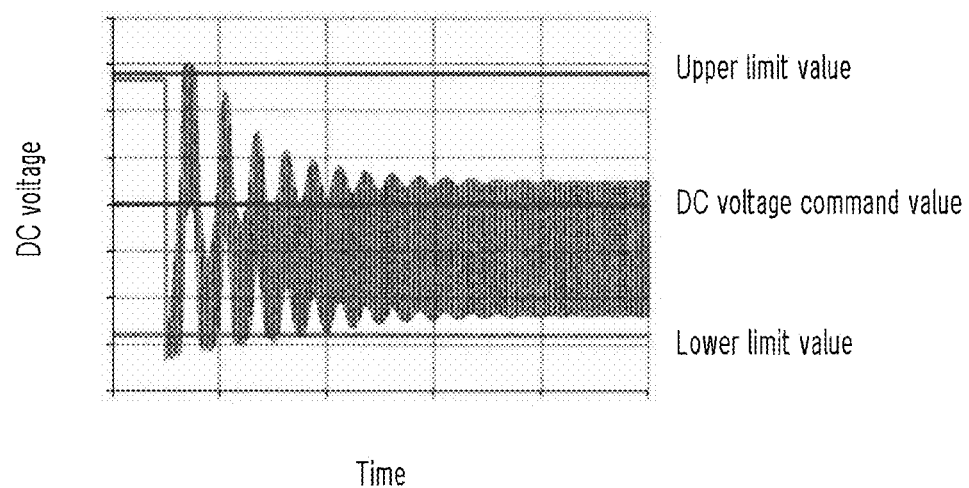
FIG. 10 are graphs showing evaluation results of DC voltage control with the dead zone.
Figure 10:
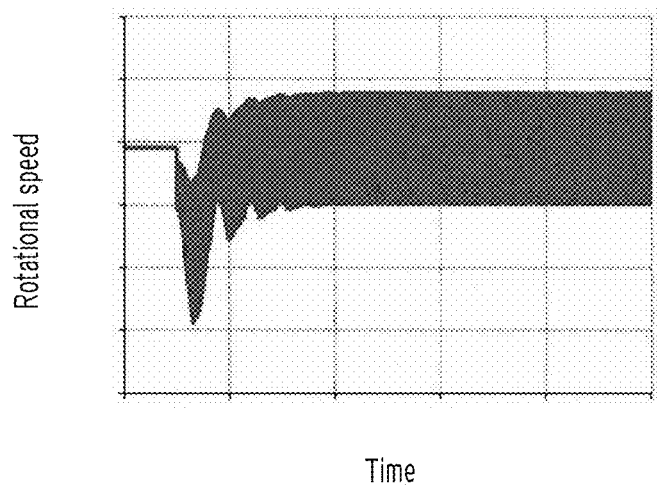
Figure 11:
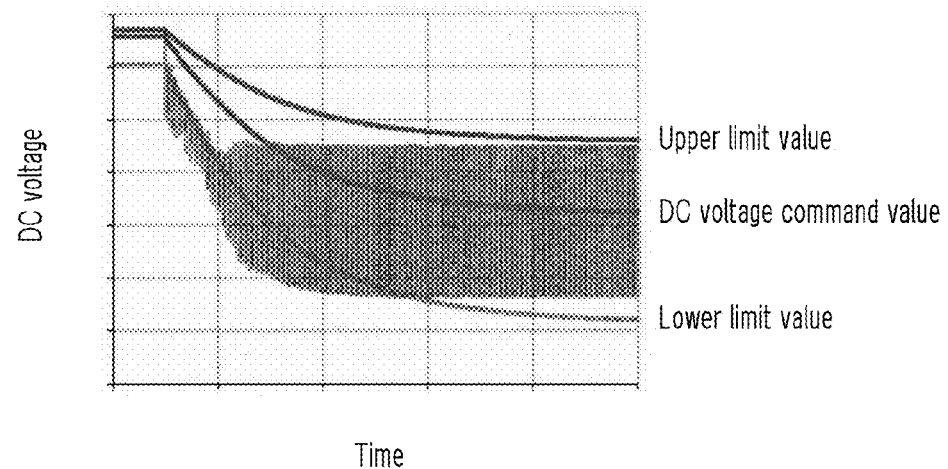
FIG. 11 are graphs showing evaluation results of the DC voltage control with the dead zone.
Figure 11:
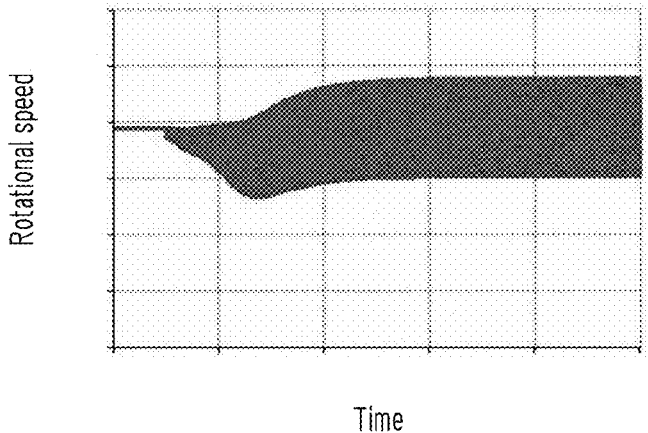

FIGS. 10 and 11 are graphs showing evaluation results of the DC voltage control with the dead zone. FIGS. 10(a) and 11(a) are graphs showing respective temporal changes in the DC voltage $V_{DC}$ under conditions 2 and 3, and FIGS. 10(b) and 11(b) are graphs showing respective temporal changes in the engine rotational speed under conditions 2 and 3. FIGS. 10(a) and 11(a) also show the upper limit and lower limit of the dead zone and the DC voltage command value $V_{DC}^*$.

In the case where the power storage device 200 is not added (see FIG. 4), the DC voltage $V_{DC}$ (see FIG. 4(a)) considerably changes.

On the other hand, in the case where the power storage device 200 is added (see FIGS. 10 and 11), the chopper circuit 220 operates when the DC voltage $V_{DC}$ deviates from the dead zone. Also, as shown in FIG. 11(a), it can be confirmed that the dead zone changes according to the change in the load.

By comparing the case where the power storage device 200 is not added (see FIG. 4(b)) with the case where the power storage device 200 is added (see FIGS. 10(b) and 11(b)), it can be seen that in the case where the power storage device 200 is added, the change in the rotational speed of the engine 111 can be suppressed.

Furthermore, by comparing FIG. 10 with FIG. 11, it can be seen that in the case shown in FIG. 11, the change in the rotational speed of the engine 111 can be maximally suppressed. The reason is considered that when the dead zone range changes slowly, the DC voltage $V_{DC}$ deviates more frequently from the lower limit of the dead zone, which causes the power storage device 200 to more frequently operate.

That is, in the DC voltage control with the dead zone of the second embodiment, the effect of suppressing the change in the rotational speed of the engine 111 is small compared with the constant DC voltage control of the first embodiment. However, when the dead zone changes slowly relative to the change in the load power P, it is possible to prolong the time period in which the DC voltage $V_{DC}$ deviates from the dead zone, which results in prolongation of the time period in which the power storage device 200 operates. Thus, it is possible to increase energy released by the power storage device 200. This can improve the effect of suppressing the change in the rotational speed of the engine 111, thereby increasing the amount of load that can be applied.

Furthermore, when continuously operating the power storage device 200 for performing the constant DC voltage control as described in the first embodiment, switching loss or conduction loss are constantly generated in semiconductor elements of the chopper circuit 220. In this regard, the DC voltage control with the dead zone of the second embodiment is effective.

(EDLC Voltage Recovery Control)

There is a problem that once the load changes, the EDLC 210 is charged/discharged and thus the amount of energy that the EDLC 210 can accumulate also changes compared with the state before the change in the load, which results in difficulty in responding to the next change in the load.

In order to resolve the above problem, the EDLC voltage $V_{EDLC}$ is recovered to a charging voltage (setting voltage $V_{EDLC}^*$) in the initial state (i.e., the state in which the EDLC 210 is pre-charged) after the change in the load.

Specifically, the control unit 130 performs the switching control of the first semiconductor switch $S_1$ or the second semiconductor switch $S_2$ so that the voltage of the power storage device 200 is recovered to the predetermined voltage.

Hereinafter, description will be given on the EDLC voltage $V_{EDLC}$ recovery control, separately in the case where the DC voltage control with the dead zone of the second embodiment is performed and in the case where the constant DC voltage control of the first embodiment is performed.

<EDLC Voltage Recovery Control Applied when Performing DC Voltage Control with Dead Zone>

In order to recover the EDLC voltage $V_{EDLC}$ to the charging voltage (setting voltage $V_{EDLC}^*$) in the initial state (i.e., the state in which the EDLC 210 is pre-charged) after the change in the load, it is necessary to charge or discharge the power storage device 200.

From this reason, at the time of performing the DC voltage control with the dead zone, the control unit 130 performs control to cause the power storage device 200 to operate when the DC voltage $V_{DC}$ falls within the dead zone and the EDLC voltage $V_{EDLC}$ is not recovered to the initial state, and to cause power storage device 200 not to operate when the EDLC 210 is recovered to the initial state.

Figure 12:
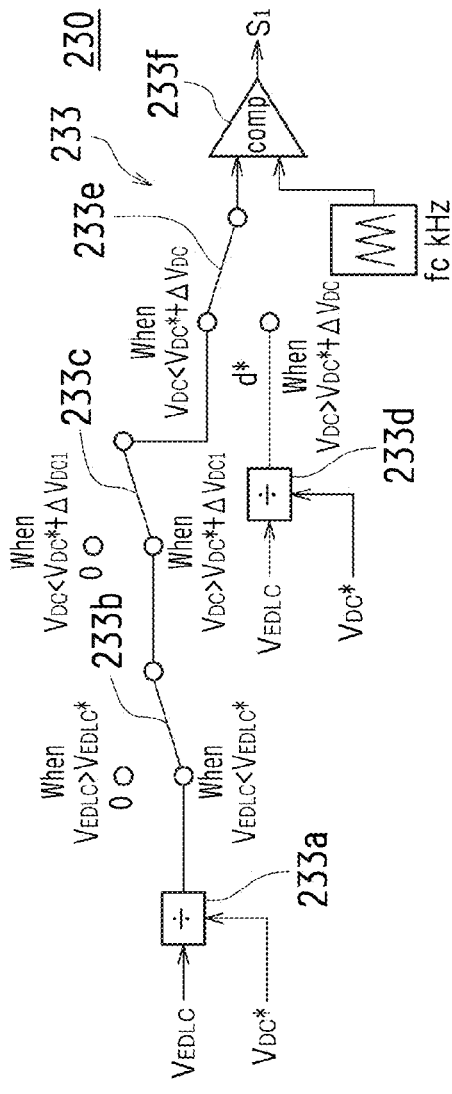
FIG. 12 are control block diagrams of a step-down chopper and a boost chopper including EDLC voltage recovery control, which is applied at the time of performing the DC voltage control with the dead zone.
Figure 12:
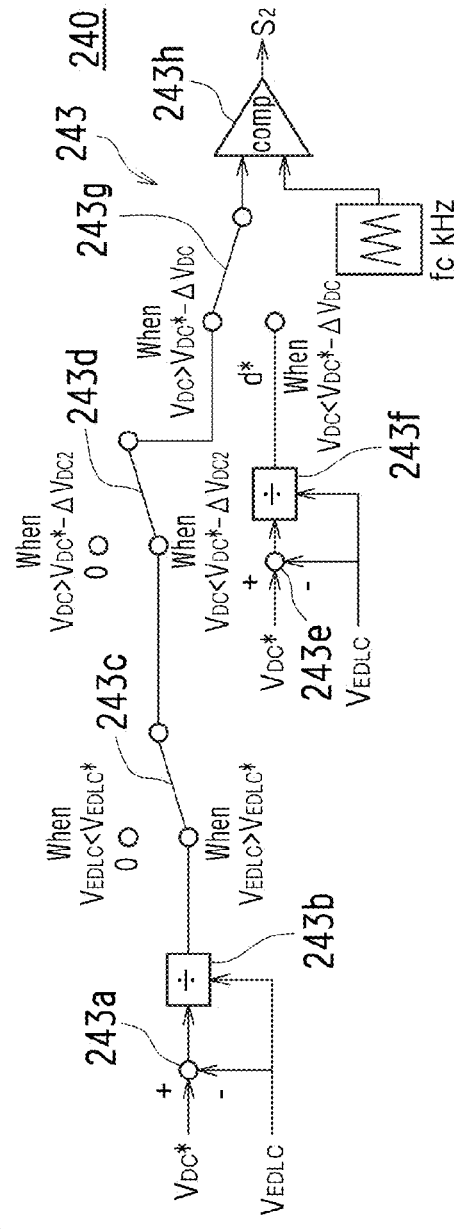

FIG. 12 are control block diagrams of the step-down chopper 230 and the boost chopper 240 including the EDLC voltage $V_{EDLC}$ recovery control, which is applied at the time of performing the DC voltage control with a dead zone. FIG. 12(a) shows an example of a third step-down chopper 233, and FIG. 12(b) shows an example of a third boost chopper 243. Note that FIG. 12(a) shows a state in which the EDLC voltage $V_{EDLC}$ recovery operation is performed on the upper limit side of the dead zone, and that FIG. 12(b) shows a state in which the EDLC voltage $V_{EDLC}$ recovery operation is performed on the lower limit side of the dead zone.

The step-down chopper 230 includes the third step-down chopper 233 in place of the second step-down chopper 232 shown in FIG. 6(a), and the boost chopper 240 includes the third boost chopper 243 in place of the second boost chopper 242 shown in FIG. 6(b). The third step-down chopper 233 and the third boost chopper 243 are to perform the EDLC voltage $V_{EDLC}$ recovery control at the time of performing the DC voltage control with the dead zone.

As shown in FIG. 12(a), the third step-down chopper 233 is constituted by: a divider 233a that divides the EDLC voltage $V_{EDLC}$ by the DC voltage command value $V_{DC}^*$; a switcher 233b that switches a value to be input between the value "0" and an output value of the divider 233a; a switcher 233c that switches a value to be input between the value "0" and an output value of the switcher 233b; a divider 233d that divides the EDLC voltage $V_{EDLC}$ by the DC voltage command value $V_{DC}^*$; a switcher 233e that switches a value to be input between an output value of the switcher 233c and an output value of the divider 233d; and a comparator 233f to which an output value of the switcher 233e and the triangle wave are input.

As shown in FIG. 12(b), the third boost chopper 243 is constituted by: a subtractor 243a that subtracts the EDLC voltage $V_{EDLC}$ from the DC voltage command value $V_{DC}^*$; a divider 243b that divides an output value of the subtractor 243a by the EDLC voltage $V_{EDLC}$; a switcher 243c that switches a value to be input between the value "0" and an output value of the divider 243b; a switcher 243d that switches a value to be input between the value "0" and an output value of the switcher 243c; a subtractor 243e that subtracts the EDLC voltage $V_{EDLC}$ from the DC voltage command value $V_{DC}^*$; a divider 243f that divides an output value of the subtractor 243e by the EDLC voltage $V_{EDLC}$; a switcher 243g that switches a value to be input between an output value of the switcher 243d and an output value of the divider 243f; and a comparator 243h to which an output value of the switcher 243g and the triangle wave are input.

Note that, in FIG. 12, d* represents a duty ratio (conduction ratio) command value, $\Delta V_{DC}$ represents the dead zone range, $\Delta V_{DC1}$ ($V_{DC}^* < \Delta V_{DC1} < \Delta V_{DC}$) represents an upper limit side dead zone range, and $\Delta V_{DC2}$ ($V_{DC}^* < \Delta V_{DC2} < \Delta V_{DC}$) represents a lower limit side dead zone range. The frequency fc of the triangle wave that is input to the comparators 233f and 243h may be appropriately set. The setting voltage $V_{EDLC}^*$, the upper limit side dead zone range $\Delta V_{DC1}$ and the lower limit side dead zone range $\Delta V_{DC2}$ are pre-stored (preset) in the store unit (non-volatile memory) 132 of the control unit 130.

Then, output signals (control signals) of the comparators 233f and 243h are respectively input to the control signal input side (in this example, base side) of the first semiconductor switch $S_1$ (see FIG. 1) and the control signal input side (in this example, base side) of the second semiconductor switch $S_2$ (see FIG. 1).

The control unit 130 detects the EDLC voltage $V_{EDLC}$ of the power storage device 200. In the case where the detected EDLC voltage $V_{EDLC}$ is lower than the setting voltage $V_{EDLC}^*$, the control unit 130 performs the step-down chopper operation when the DC voltage $V_{DC}$ falls within the dead zone, so that the EDLC 210 is charged. On the other hand, in the case where the detected EDLC voltage $V_{EDLC}$ is higher than the setting voltage $V_{EDLC}^*$, the control unit 130 performs the boost chopper operation when the DC voltage $V_{DC}$ falls within the dead zone, so that the EDLC 210 is discharged. The control unit 130 can detect the EDLC voltage $V_{EDLC}$ using an EDLC voltage detection unit (not shown).

Specifically, the control unit 130 performs the switching control of the first semiconductor switch $S_1$ of the power storage device 200 when the DC voltage $V_{DC}$ falls within the dead zone range and when the EDLC voltage $V_{EDLC}$ of the power storage device 200 is lower than the setting voltage $V_{EDLC}*$ (the EDLC voltage $V_{EDLC}$ in the initial state), and stops the switching control of the first semiconductor switch $S_1$ when the EDLC voltage $V_{EDLC}$ is recovered to the setting voltage $V_{EDLC}*$. On the other hand, the control unit 130 performs the switching control of the second semiconductor switch $S_2$ of the power storage device 200 when the DC voltage $V_{DC}$ falls within the dead zone range and when the EDLC voltage $V_{EDLC}$ of the power storage device 200 is higher than the setting voltage $V_{EDLC}*$, and stops the switching control of the second semiconductor switch $S_2$ when the EDLC voltage $V_{EDLC}$ is recovered to the setting voltage $V_{EDLC}*$. In this embodiment, the control unit 130 performs control, when the DC voltage $V_{DC}$ falls within the dead zone, to execute the chopper operation after elapse of a predetermined time from the change in the EDLC voltage $V_{EDLC}$. This is to recover the EDLC voltage $V_{EDLC}$ after the DC voltage $V_{DC}$ converges into the steady state.

The processing of the step-down chopper 230 and the boost chopper 240 shown in FIG. 12 may be basically similar to the processing shown in the flowchart of FIG. 7, except for steps S24 and S27.

That is, in step S22 shown in FIG. 7, when the DC voltage $V_{DC}$ is higher than the added value ($V_{DC}*+\Delta V_{DC}$) (step S22: Yes), the control unit 130 performs the step-down chopper operation (step S23) by switching the switcher 233e to input the output value of the divider 233d to the comparator 233f in the third step-down chopper 233 (see FIG. 12(a)), then the procedure goes to step S25.

On the other hand, in step S22 shown in FIG. 7, when the DC voltage $V_{DC}$ is lower than (or not more than) the added value ($V_{DC}*+\Delta V_{DC}$) (step S22: No), the control unit 130 performs the EDLC voltage $V_{EDLC}$ recovery control (step S24) by switching the switcher 233e to input the output value of the switcher 233c to the comparator 233f in the third step-down chopper 233 (see FIG. 12(a)), then the procedure goes to step S25. At this time, the boost chopper operation is being stopped. Then, the control unit 130 switches the switcher 233c to input the output value of the switcher 233b when the DC voltage $V_{DC}$ is higher than an upper limit side added value ($V_{DC}*+\Delta V_{DC1}$) using the upper limit side dead zone range $\Delta V_{DC1}$ ($V_{DC}*<\Delta V_{DC1}<\Delta V_{DC}$), and also switches the switcher 233b to input the output value of the divider 233a after elapse of the predetermined time from the time point at which the EDLC voltage $V_{EDLC}$ is lower than the setting voltage $V_{EDLC}*$. On the other hand, the control unit 130 switches the switcher 233b to input the value "0" when the EDLC voltage $V_{EDLC}$ is higher than (or not less than) the setting voltage $V_{EDLC}*$. Also, the control unit 130 switches the switcher 233c to input the value "0" when the DC voltage $V_{DC}$ is lower than (or not more than) the upper limit side added value ($V_{DC}*+\Delta V_{DC1}$).

Furthermore, in step S25 shown in FIG. 7, when the DC voltage $V_{DC}$ is lower than the subtracted value ($V_{DC}*-\Delta V_{DC}$) (step S25: Yes), the control unit 130 performs the boost chopper operation (step S26) by switching the switcher 243g to input the output value of the divider 243f to the comparator 243h in the third boost chopper 243 (see FIG. 12(b)), then the procedure goes to step S28.

On the other hand, in step S25 shown in FIG. 7, when the DC voltage $V_{DC}$ is higher than (or not less than) the subtracted value ($V_{DC}*-\Delta V_{DC}$) (step S25: No), the control unit 130 performs the EDLC voltage $V_{EDLC}$ recovery control (step S27) by switching the switcher 243g to input the output value of the switcher 243d to the comparator 243h in the third boost chopper 243 (see FIG. 12(b)), then the procedure goes to step S28. At this time, the step-down chopper operation is being stopped. Then, the control unit 130 switches the switcher 243d to input the output value of the switcher 243c when the DC voltage $V_{DC}$ is lower than a lower limit side subtracted value ($V_{DC}*-\Delta V_{DC2}$) using the lower limit side dead zone range $\Delta V_{DC2}$ ($V_{DC}*<\Delta V_{DC2}<\Delta V_{DC}$), and also switches the switcher 243c to input the output value of the divider 243b after elapse of the predetermined time from the time point at which the EDLC voltage $V_{EDLC}$ is higher than the setting voltage $V_{EDLC}*$. On the other hand, the control unit 130 switches the switcher 243c to input the value "0" when the EDLC voltage $V_{EDLC}$ is lower than (or not more than) the setting voltage $V_{EDLC}*$. Also, the control unit 130 switches the switcher 243d to input the value "0" when the DC voltage $V_{DC}$ is higher than (or not less than) the lower limit side subtracted value ($V_{DC}*-\Delta V_{DC2}$).

Figure 13:
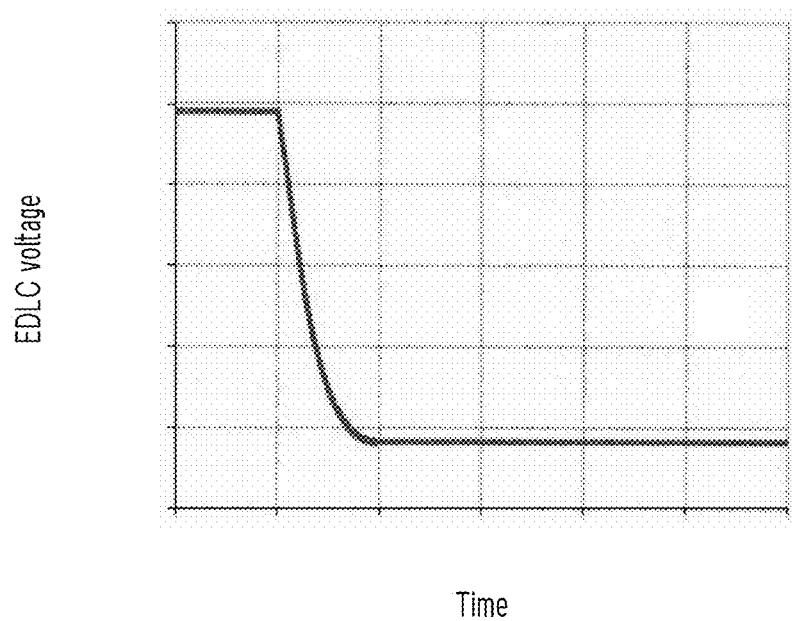
FIG. 13 are graphs showing waveforms of the EDLC voltage when the load changes from no-load to full-load.
Figure 13:
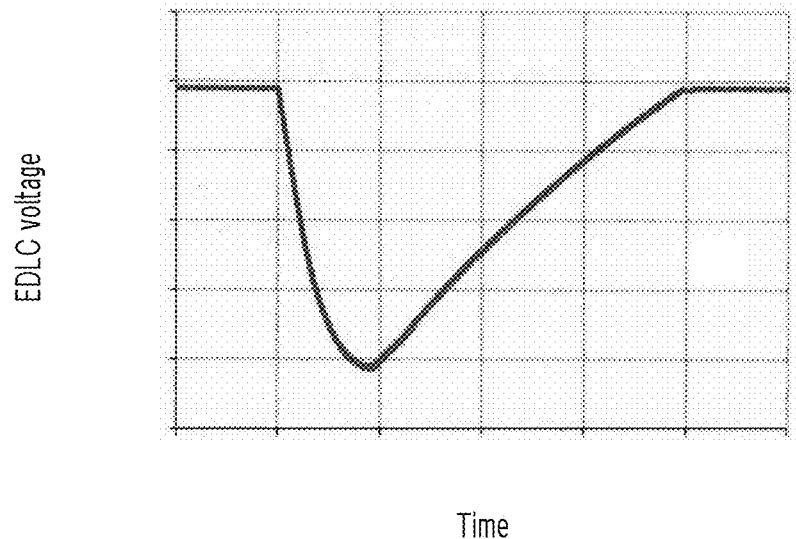

FIG. 13 are graphs showing waveforms of the EDLC voltage $V_{EDLC}$ when the load changes from no-load to full-load. FIG. 13(a) is a graph showing the waveform in the case where the EDLC voltage $V_{EDLC}$ recovery control is not performed. FIG. 13(b) is a graph showing the waveform in the case where the EDLC voltage $V_{EDLC}$ recovery control is performed. Note that FIG. 13 show examples in which the EDLC 210 is pre-charged and the load changes from no-load to full-load.

As shown in FIG. 13(a), when the EDLC voltage $V_{EDLC}$ recovery control is not performed, the EDLC voltage $V_{EDLC}$ is being lowered, which means that the energy that can be accumulated is reduced. On the other hand, as shown in FIG. 13(b), when the EDLC voltage $V_{EDLC}$ recovery control is performed, it can be confirmed that the EDLC voltage $V_{EDLC}$ is recovered to the charging voltage (setting voltage $V_{EDLC}*$) in the initial state (i.e., the state in which the EDLC 210 is pre-charged). Thus, it is possible to respond to the next change in the load.

<EDLC Voltage Recovery Control Applied when Performing Constant DC Voltage Control>

The EDLC voltage $V_{EDLC}$ recovery control as shown in FIG. 12 requires the condition in which the DC voltage $V_{DC}$ falls within the dead zone in the steady state and furthermore the power storage device 200 does not operate. Accordingly, the same voltage recovery control cannot be applied when performing the constant DC voltage control without the dead zone.

Thus, at the time of performing the constant DC voltage control, the control unit 130 performs the voltage recovery control different from the EDLC voltage $V_{EDLC}$ recovery control shown in FIG. 12.

Figure 14:
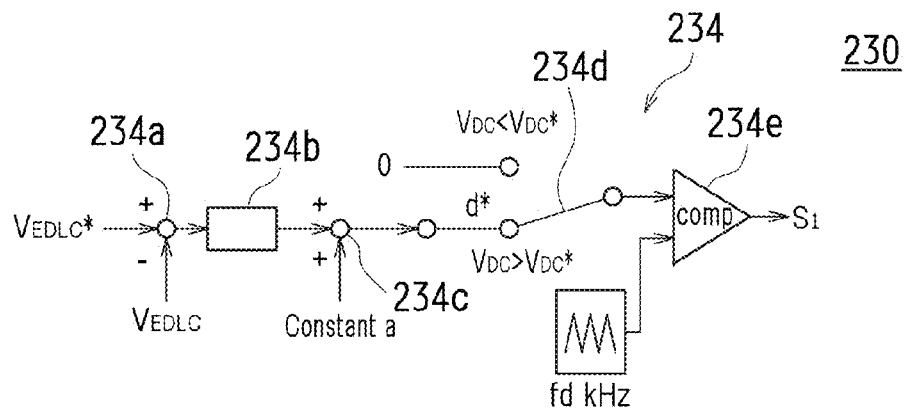
FIG. 14 are control block diagrams of a step-down chopper and a boost chopper including the EDLC voltage recovery control, which is applied at the time of performing the constant DC voltage control.
Figure 14:
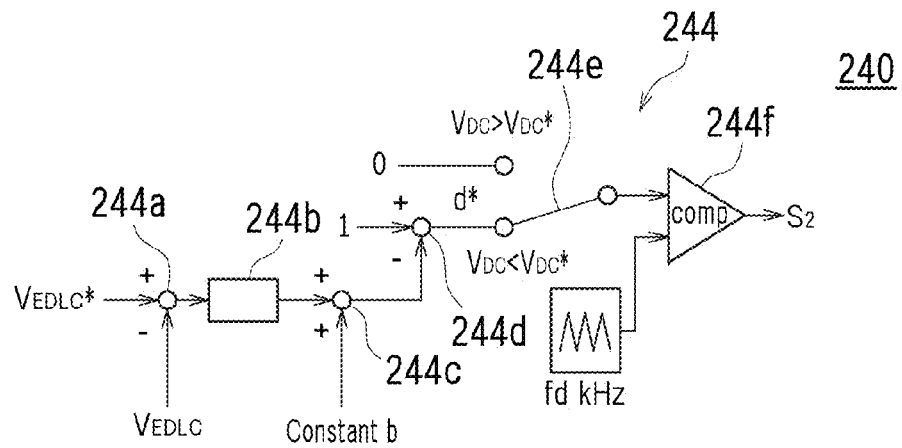

FIG. 14 are control block diagrams of the step-down chopper 230 and the boost chopper 240 including the EDLC voltage $V_{EDLC}$ recovery control, which is applied at the time of performing the constant DC voltage control. FIG. 14(a) shows an example of a fourth step-down chopper 234, and FIG. 14(b) shows an example of a fourth boost chopper 244. Note that FIG. 14(a) shows the state in which the step-down chopper control is performed while the EDLC voltage $V_{EDLC}$ recovery control is performed, and FIG. 14(b) shows the state in which the boost chopper control is performed while the EDLC voltage $V_{EDLC}$ recovery control is performed.

The step-down chopper 230 includes the fourth step-down chopper 234 in place of the first step-down chopper 231 shown in FIG. 2(a), and the boost chopper 240 includes the fourth boost chopper 244 in place of the first boost chopper 241 shown in FIG. 2(b). The fourth step-down chopper 234 and the fourth boost chopper 244 are to perform the EDLC voltage $V_{EDLC}$ recovery control while performing the constant DC voltage control.

As shown in FIG. 14(a), the fourth step-down chopper 234 is constituted by: a subtractor 234a that subtracts the EDLC voltage $V_{EDLC}$ from the setting voltage $V_{EDLC}^*$; a controller 234b; an adder 234c that adds an output value of the controller 234b to a normal value of the duty ratio (conduction ratio) command value d* (i.e., duty ratio command value when the DC voltage $V_{DC}$ is controlled to be constantly the DC voltage command value $V_{DC}^*$) (see constant a in FIG. 14(a)) in the switching control of the first semiconductor switch $S_1$ of the power storage device 200; a switcher 234d that switches a value to be input between the value "0" and an output value of the adder 234c; and a comparator 234e to which an output value of the switcher 234d and the triangle wave are input.

As shown in FIG. 14(b), the fourth boost chopper 244 is constituted by: a subtractor 244a that subtracts the EDLC voltage $V_{EDLC}$ from the setting voltage $V_{EDLC}^*$; a controller 244b; an adder 244c that adds an output value of the controller 244b to a normal value of the duty ratio (conduction ratio) command value d* (i.e., duty ratio command value when the DC voltage $V_{DC}$ is controlled to be constantly the DC voltage command value $V_{DC}^*$) (see constant b in FIG. 14(b)) in the switching control of the second semiconductor switch $S_2$ of the power storage device 200; a subtractor 244d that subtracts an output value of the adder 244c from the value "1"; a switcher 244e that switches a value to be input between the value "0" and an output value of the subtractor 244d; and a comparator 244f to which an output value of the switcher 244e and the triangle wave are input.

Note that, in FIG. 14, d* represents a duty ratio (conduction ratio) command value. The frequency fd of the triangle wave that is input to the comparators 234e and 244f may be appropriately set.

Then, output signals (control signals) of the comparators 234e and 244f are respectively input to a control signal input side (in this example, base side) of the first semiconductor switch $S_1$ (see FIG. 1) and a control signal input side (in this example, base side) of the second semiconductor switch $S_2$ (see FIG. 1).

The control unit 130 detects the EDLC voltage $V_{EDLC}$ of the power storage device 200. When the detected EDLC voltage $V_{EDLC}$ is lower than the setting voltage $V_{EDLC}^*$ (EDLC voltage $V_{EDLC}$ in the initial state), in the state in which the DC voltage $V_{DC}$ converges into the DC voltage command value $V_{DC}^*$ (target voltage of the DC voltage $V_{DC}$), the control unit 130 makes the duty ratio (conduction ratio) d in the switching control of the first semiconductor switch $S_1$ of the power storage device 200 higher than the normal value (see constant a in FIG. 14(a)), thus changes, in the distribution ratio [a:b] of the duty ratio in the switching control of the first semiconductor switch $S_1$ and the second semiconductor switch $S_2$, the distribution [a] on the side of the first semiconductor switch $S_1$. Then, when the EDLC voltage $V_{EDLC}$ is recovered to the setting voltage $V_{EDLC}^*$, the control unit 130 restores the duty ratio d in the switching control of the first semiconductor switch $S_1$ to the normal value. On the other hand, when the detected EDLC voltage $V_{EDLC}$ is higher than the setting voltage $V_{EDLC}^*$, in the state in which the DC voltage $V_{DC}$ converges into the DC voltage command value $V_{DC}^*$, the control unit 130 makes the duty ratio (conduction ratio) d in the switching control of the second semiconductor switch $S_2$ of the power storage device 200 higher than the normal value (see constant b in FIG. 14(b)), thus changes, in the distribution ratio [a:b] of the duty ratio in the switching control of the first semiconductor switch $S_1$ and the second semiconductor switch $S_2$, the distribution [b] on the side of the second semiconductor switch $S_2$. Then, when the EDLC voltage $V_{EDLC}$ is recovered to the setting voltage $V_{EDLC}^*$, the control unit 130 restores the duty ratio d in the switching control of the second semiconductor switch $S_2$ to the normal value. The control unit 130 can detect the EDLC voltage $V_{EDLC}$ using an EDLC voltage detection unit (not shown).

In this way, the control unit 130 can keep the DC voltage $V_{DC}$ and the EDLC voltage $V_{EDLC}$ constant.

The processing of the step-down chopper 230 and the boost chopper 240 shown in FIG. 14 may be basically similar to the processing shown in the flowchart of FIG. 3, except for steps S13 and S16.

That is, in step S12 shown in FIG. 3, when the DC voltage $V_{DC}$ is higher than the DC voltage command value $V_{DC}^*$ (step S12: Yes), the control unit 130 performs the step-down chopper operation by switching the switcher 234d to input the output value of the adder 234c to the comparator 234e in the fourth step-down chopper 234 (see FIG. 14(a)), while performing the EDLC voltage $V_{EDLC}$ recovery control (step S13). Then the procedure goes to step S15.

On the other hand, in step S12 shown in FIG. 3, when the DC voltage $V_{DC}$ is lower than (or not more than) the DC voltage command value $V_{DC}^*$ (step S12: No), the control unit 130 stops the switching control of the first semiconductor switch $S_1$ in the power storage device 200, by switching the switcher 234d to input the value "0" to the comparator 234e in the fourth step-down chopper 234 (see FIG. 14(a)), thereby stopping the step-down chopper operation (step S14), thus the procedure goes to step S15.

Furthermore, in step S15 shown in FIG. 3, when the DC voltage $V_{DC}$ is lower than the DC voltage command value $V_{DC}^*$ (step S15: Yes), the control unit 130 performs the boost chopper operation by switching the switcher 244e to input the output value of the subtractor 244d to the comparator 244f in the fourth boost chopper 244 (see FIG. 14(b)), while performing the EDLC voltage $V_{EDLC}$ recovery control (step S16). Then the procedure goes to step S18.

On the other hand, in step S15 shown in FIG. 3, when the DC voltage $V_{DC}$ is higher than (or, not less than) the DC voltage command value $V_{DC}^*$ (step S15: No), the control unit 130 stops the switching control of the second semiconductor switch $S_2$ in the power storage device 200, by switching the switcher 244e to input the value "0" to the comparator 244f in the fourth boost chopper 244 (see FIG. 14(b)), thereby stopping the boost chopper operation (step S17), thus the procedure goes to step S18.

Figure 15:
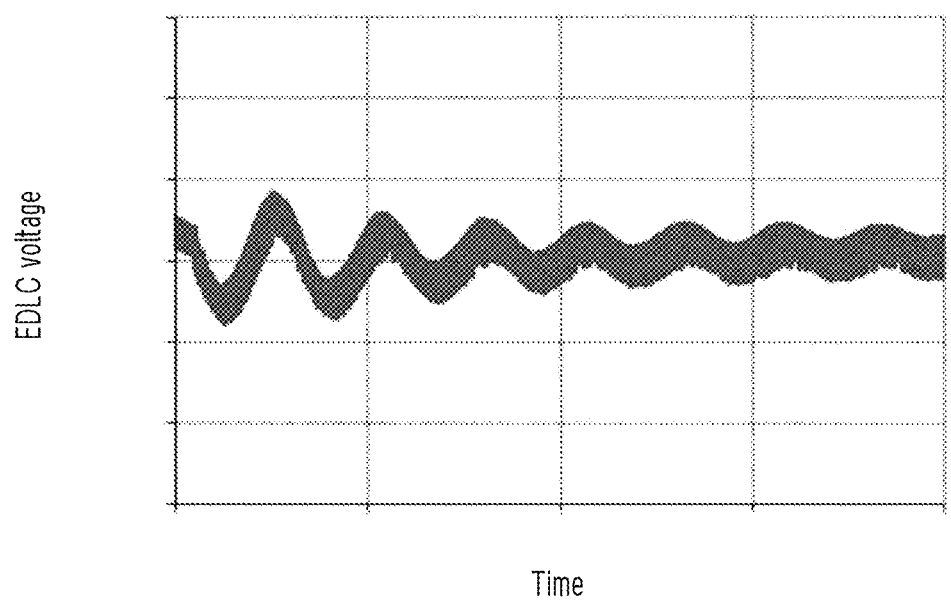
FIG. 15 is a graph showing a waveform of the EDLC voltage when the load changes from no-load to full-load in the EDLC voltage recovery control that is applied at the time of performing the constant DC voltage control.

FIG. 15 is a graph showing a waveform of the EDLC voltage $V_{EDLC}$ when the load changes from no-load to full-load in the EDLC voltage $V_{EDLC}$ recovery control that is applied at the time of performing the constant DC voltage control. Note that FIG. 15 shows an example in which the EDLC 210 is pre-charged and the load changes from no-load to full-load.

As shown in FIG. 15, when the EDLC voltage $V_{EDLC}$ recovery control is performed, it can be confirmed that the EDLC voltage $V_{EDLC}$ is recovered to the charging voltage (setting voltage $V_{EDLC}^*$) in the initial state (i.e., the state in which the EDLC 210 is pre-charged). Thus, it is possible to respond to the next change in the load.

(Effect of First Embodiment)

In the charge/discharge control according to the first embodiment, the control unit 130 detects the DC voltage $V_{DC}$ between the paths LN1 and LN2 from the rectifier 113 to the inverter 120. When the DC voltage $V_{DC}$ is higher than the DC voltage command value $V_{DC}^*$ (target voltage), the duty ratio d in the switching control of the first semiconductor switch $S_1$ of the power storage device 200 is made higher than the duty ratio d in the switching control of the second semiconductor switch $S_2$ of the power storage device 200. When the DC voltage $V_{DC}$ is lower than the DC voltage command value $V_{DC}^*$ (target voltage), the duty ratio d in the switching control of the second semiconductor switch $S_2$ of the power storage device 200 is made higher than the duty ratio d in the switching control of the first semiconductor switch $S_1$ of the power storage device 200. Thus, there is no need to calculate the shortage of the power to be supplied to the load Lo. Therefore, it is possible to suppress the change in the rotational speed of the engine 111 in the engine generator 100 during autonomous operation without calculating the shortage of the power to be supplied to the load Lo, thereby enabling to increase the amount of load that can be applied.

Also, in the first embodiment, the control unit 130 performs the switching control of the first semiconductor switch $S_1$ or the second semiconductor switch $S_2$ so as to recover the voltage of the power storage device 200 to the predetermined voltage. Thus, the EDLC voltage $V_{EDLC}$ can be recovered to the charging voltage (setting voltage $V_{EDLC}^*$) in the initial state (i.e., the state in which the EDLC 210 is pre-charged) after the change in the load, which makes possible to respond to the next change in the load. For example, when the EDLC voltage $V_{EDLC}$ of the power storage device 200 is lower than the setting voltage $V_{EDLC}^*$, in the state in which the DC voltage $V_{DC}$ converges into the DC voltage command value $V_{DC}^*$ (target voltage), the control unit 130 makes the duty ratio d in the switching control of the first semiconductor switch $S_1$ of the power storage device 200 higher than the normal value, and thus changes, in the distribution ratio [a:b] of the duty ratio d in the switching control of the first semiconductor switch $S_1$ and the second semiconductor switch $S_2$, the distribution [a] on the side of the first semiconductor switch $S_1$. Thus, in the case where the power storage device 200 discharges, it is possible to recover the EDLC voltage $V_{EDLC}$ of the power storage device 200 to the setting voltage $V_{EDLC}^*$.

(Effect of Second Embodiment)

In the charge/discharge control according to the second embodiment, the control unit 130 detects the DC voltage $V_{DC}$ between the paths LN1 and LN2 from the rectifier 113 to the inverter 120. When the DC voltage $V_{DC}$ is higher than the value obtained by adding the dead zone range $\Delta V_{DC}$ to the DC voltage command value $V_{DC}^*$ (target voltage), the duty ratio d in the switching control of the first semiconductor switch $S_1$ of the power storage device 200 is made higher than the duty ratio d in the switching control of the second semiconductor switch $S_2$ of the power storage device 200. When the DC voltage $V_{DC}$ is lower than the value obtained by subtracting the dead zone range $\Delta V_{DC}$ from the DC voltage command value $V_{DC}^*$ (target voltage), the duty ratio d in the switching control of the second semiconductor switch $S_2$ of the power storage device 200 is made higher than the duty ratio d in the switching control of the first semiconductor switch $S_1$ of the power storage device 200. Thus, there is no need to calculate the shortage of the power to be supplied to the load Lo. Therefore, it is possible to maintain the change in the rotational speed of the engine 111 in the engine generator 100 during autonomous operation within the predetermined acceptable rotational speed range without calculating the shortage of the power to be supplied to the load Lo, thereby enabling to increase the amount of load that can be applied.

Also, in the second embodiment, the load power P is detected, and the dead zone is changed relative to the load power P, with the delay corresponding to the time constant $\tau$ that is not less than the predetermined value. Thus, it is possible to improve the effect of suppressing the change in the rotational speed of the engine 111 in the engine generator 100 without calculating the shortage of the power to be supplied to the load Lo.

Also, in the second embodiment, the control unit 130 performs the switching control of the first semiconductor switch $S_1$ or the second semiconductor switch $S_2$ so as to recover the voltage of the power storage device 200 to the predetermined voltage. Thus, the EDLC voltage $V_{EDLC}$ can be recovered to the charging voltage (setting voltage $V_{EDLC}^*$) in the initial state (i.e., the state in which the EDLC 210 is pre-charged) after the change in the load, which makes possible to respond to the next change in the load. For example, in the case where the power storage device 200 discharges, when the EDLC voltage $V_{EDLC}$ of the power storage device 200 is lower than the setting voltage $V_{EDLC}^*$ while the DC voltage $V_{DC}$ falls within the dead zone range, the control unit 130 performs the switching control of the first semiconductor switch $S_1$ of the power storage device 200 so as to charge the power storage device 200. Thus, the EDLC voltage $V_{EDLC}$ of the power storage device 200 can be recovered to the setting voltage $V_{EDLC}^*$.

The present invention is not limited to the aforesaid embodiments, and may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein.

This application claims priority based on Patent Application No. 2013-179794 filed in Japan on Aug. 30, 2013. The entire contents thereof are hereby incorporated in this application by reference.

INDUSTRIAL APPLICABILITY

The present invention relates to an engine generator that is provided with a power storage device including a capacitor and the like on the DC side, which is specifically to suppress the change in the rotational speed of the engine during autonomous operation without calculating shortage of power to be supplied to the load. Thus, the present invention can be applied for the purpose of increasing the amount of load that can be applied.

DESCRIPTION OF REFERENCE NUMERALS

100 Engine generator
111 Engine
112 Generator
113 Rectifier
120 Inverter
130 Control unit
200 Power storage device
210 EDLC (electric double layer capacitor)
220 Chopper circuit
230 Step-down chopper
231 First step-down chopper 232 Second step-down chopper
233 Third step-down chopper
234 Fourth step-down chopper
240 Boost chopper
241 First boost chopper
242 Second boost chopper
243 Third boost chopper
244 Fourth boost chopper
LN 1 Positive electrode path
LN 2 Negative electrode path
Lo Load
P Load power
$S_1$ First semiconductor switch (example of charging conductor)
$S_2$ Second semiconductor switch (example of discharging conductor)
$V_{DC}$ DC voltage
$V_{DC}$* DC voltage command value (target voltage)
$V_{EDLC}$ EDLC voltage
$V_{EDLC}$* Setting voltage
$\Delta V_{DC}$ Dead zone range
d Duty ratio (current ratio)
d* Duty ratio (current ratio) command value
τ Delay time constant

The invention claimed is:

1. An engine generator comprising:
an engine;
a generator configured to be driven by the engine;
a rectifier configured to rectify an output from the generator;
an inverter configured to convert a DC power from the rectifier into an AC power; and
a power storage device provided in parallel with the generator in a path from the rectifier to the inverter, the power storage device including a charging conductor and a discharging conductor,
wherein the engine generator controls conduction of the charging conductor and the discharging conductor so as to control charge/discharge of the power storage device,
wherein a DC voltage in the path from the rectifier to the inverter is detected in controlling the charge/discharge,
wherein a duty ratio in switching control of the charging conductor of the power storage device is set higher than a duty ratio in the switching control of the discharging conductor of the power storage device when the DC voltage is higher than a value obtained by adding a dead zone range to a target voltage of the DC voltage,
wherein the duty ratio in the switching control of the discharging conductor of the power storage device is set higher than the duty ratio in the switching control of the charging conductor of the power storage device when the DC voltage is lower than a value obtained by subtracting the dead zone range from the target voltage, and
wherein a load power is detected so as to change the dead zone to a value relative to the load power with a delay corresponding to a time constant not less than a predetermined value.

2. The engine generator according to claim 1, wherein, when a voltage of the power storage device is lower than a setting voltage in a state in which the DC voltage falls within the dead zone range, the switching control of the charging conductor of the power storage device is performed.

3. The engine generator according to claim 1, wherein the switching control of the discharging conductor or the charging conductor is performed so as to recover a voltage of the power storage device to a predetermined voltage.

4. The engine generator according to claim 2, wherein the switching control of the discharging conductor or the charging conductor is performed so as to recover a voltage of the power storage device to a predetermined voltage.

* * * * *